United States Patent
Ahi

(10) Patent No.: US 10,783,612 B2
(45) Date of Patent: Sep. 22, 2020

(54) METHOD AND SYSTEM FOR ENHANCING RESOLUTION OF TERAHERTZ IMAGING

(71) Applicant: Kiarash Ahi, San Jose, CA (US)

(72) Inventor: Kiarash Ahi, San Jose, CA (US)

( * ) Notice: Subject to any disclaimer, the term of this patent is extended or adjusted under 35 U.S.C. 154(b) by 0 days.

(21) Appl. No.: 16/732,298

(22) Filed: Dec. 31, 2019

(65) Prior Publication Data
US 2020/0167897 A1 May 28, 2020

Related U.S. Application Data

(63) Continuation-in-part of application No. 15/721,876, filed on Sep. 30, 2017, now abandoned.

(60) Provisional application No. 62/402,478, filed on Sep. 30, 2016.

(51) Int. Cl.
| | | |
|---|---|---|
| *G06K 9/00* | (2006.01) | |
| *G06T 3/40* | (2006.01) | |
| *G01J 5/10* | (2006.01) | |
| *G06T 5/20* | (2006.01) | |
| *G01J 5/00* | (2006.01) | |

(52) U.S. Cl.
CPC .............. *G06T 3/4053* (2013.01); *G01J 5/10* (2013.01); *G06T 5/20* (2013.01); *G01J 2005/0077* (2013.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 2004/0065831 A1* | 4/2004 | Federici | ............. | G01N 21/3581 250/341.1 |
| 2014/0002666 A1* | 1/2014 | Eden | ............. | G01J 5/0803 348/164 |
| 2015/0092063 A1* | 4/2015 | Eden | ............. | G01J 5/0846 348/164 |

OTHER PUBLICATIONS

Ahi, Kiarash & Anwar, Mehdi. (2016). Developing terahertz imaging equation and enhancement of the resolution of terahertz images using deconvolution. Proc. SPIE 9856, Terahertz Physics, Devices, and Systems X: Advanced Applications in Industry and Defense. 98560N. 10.1117/12.2228680. (Year: 2016).*

* cited by examiner

*Primary Examiner* — Hadi Akhavannik

(57) ABSTRACT

This disclosure presents a novel method and system for enhanced-resolution THz imaging whereby an enhanced-resolution THz image is developed by deconvolution of the original THz image that is developed using THz signals that are manipulated in time-domain and/or in frequency-domain and a point spread function (PSF) that is developed according to an equation wherein said THz signals in time-domain and/or frequency-domain are input parameters. By using this method and system, enhanced-resolution THz images with better quality and resolution than the quality and resolution of the conventional THz images are achieved. By implementing this method, finer features are observable in the resulted image and more accurate measurement is achieved.

20 Claims, 37 Drawing Sheets

METHOD AND SYSTEM FOR ENHANCING RESOLUTION OF TERAHERTZ IMAGING

CROSS REFERENCES TO RELATED APPLICATIONS

Figure 1:
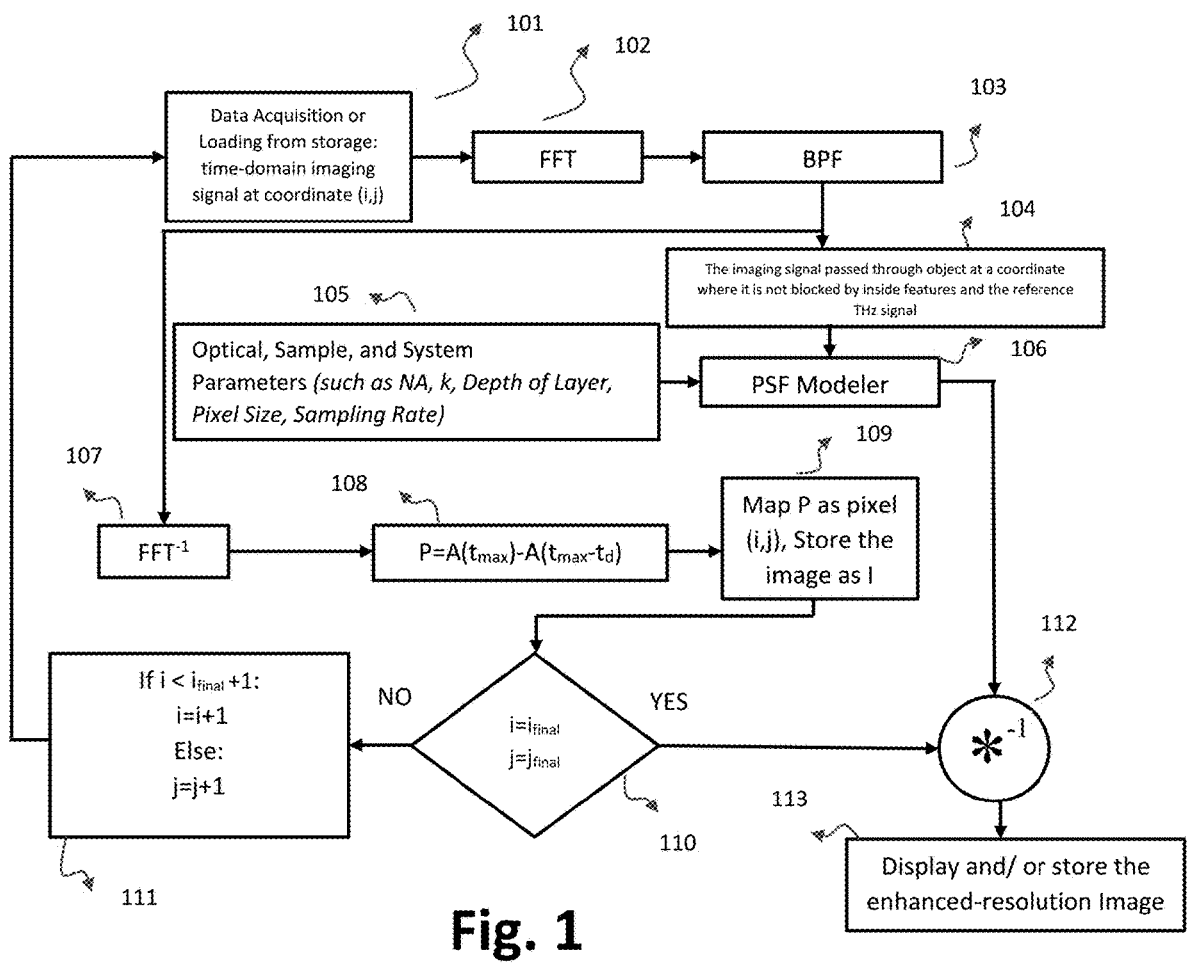

This application is a CIP of Ser. No. 15/721,876, filed Sep. 30, 2017, which claims benefit of priority to U.S. Provisional Patent Application Ser. No. 62/402,478, filed Sep. 30, 2016 by the present inventor.

FIELD OF INVENTION

The technology relates to the field of terahertz imaging. Field of Search: 702/28

BACKGROUND

Prior Art

The following is a tabulation of some prior art that presently appears relevant:

U.S. Patents

| U.S. Pat. No. | Issue Date | Patentee |
| --- | --- | --- |
| 5,623,145 | April 1997 | Nuss |
| 5,710,430 | January 1998 | Nuss |
| 5,939,721 | August 1999 | Jacobsen, et al. |

Nonpatent Literature Documents

Ahi K. "A method and system for enhancing the resolution of terahertz imaging," Meas J Int Meas Confed 2019; 138:614-9. doi:10.1016/j.measurement.2018.06.044

K. Ahi, "Mathematical Modeling of THz Point Spread Function and Simulation of THz Imaging Systems," IEEE Trans. Terahertz Sci. Technol., vol. 7, no. 6, 2017.

K. Ahi, et a "Developing terahertz imaging equation and enhancement of the resolution of terahertz images using deconvolution," in Proc. SPIE 9856, Terahertz Physics, Devices, and Systems X: Advanced Applications in Industry and Defense, 98560N, 2016, p. 98560N.

K. Ahi, et a "Modeling of terahertz images based on x-ray images: a novel approach for verification of terahertz images and identification of objects with fine details beyond terahertz resolution," in Proc. SPIE 9856, Terahertz Physics, Devices, and Systems X: Advanced Applications in Industry and Defense, 985610, 2016, p. 985610.

K. Ahi, et a "Quality control and authentication of packaged integrated circuits using enhanced-spatial-resolution terahertz time-domain spectroscopy and imaging," Opt. Lasers Eng., July 2017.

BACKGROUND ART AND TECHNICAL PROBLEM

Recent developments in methods for generating and detecting terahertz radiation have produced an interest in using terahertz beams for transmission imaging of packaged objects. Typically, in Terahertz Time-Domain Spectroscopy (THz-TDS) a sequence of femtosecond pulses from a mode-locked laser are focused onto a semiconductor device, or a nonlinear crystal, that is configured to produce THz radiation. Early methods and apparatus for terahertz imaging are described in U.S. Pat. No. 5,623,145, to Nuss, and in U.S. Pat. No. 5,710,145, to Nuss, both of which are hereby incorporated herein by reference in their entireties.

THz transmission imaging suffers from low resolution. As an example, FIG. 4 B illustrates a transmission THz image of a packaged Integrated Circuit (IC), the resolution is not sufficient to observe the inside wires of the IC in the image, the resolution is not sufficient to determine the shape and size of the die-frame on the image either.

SOLUTION TO THE PROBLEM IN PRIOR ART

For overcoming the diffraction and achieving super-resolution THz images, near-field THz imaging systems were proposed [1]. In near-field systems, the imaging beam is projected through an aperture with a very small diameter (implemented in nano-scale). The object is placed at a subwavelength distance from the aperture. Thus, the shortcoming of near-field THz imaging is the fact that imaging of the objects which are thicker than roughly a hundred micrometers is not possible [2].

Regarding far-field THz imaging, Trofimov et al. have used correlation and edge sharpening algorithms for enhancing the quality of THz images [3], [4]. Schildknecht et al. have proposed blind-deconvolution of the THz image and a numerically estimated PSF. As a result, they could reveal traces of a slit as narrow as/mm in a metallic test structure by using beams of 0.5-0.75 THz [5]. Hu and Nuss have proposed the possibility of frequency-domain filtering by using DSP to process only higher THz frequencies for achieving higher resolution [6]. Burford et al. have found that applying high-pass error function filters in the frequency-domain leads to improving image clarity and minimizing distortion of the time-domain THz signal [7]. Zhang et al. have shown that THz images in frequency-domain might contain more information than THz images in the time-domain [8]. Menlo Systems GmbH offers complementary computer programs called "MenloSystems ImageViewer BETA" and "MenloSystems Image Loader BETA" for enhancing the quality of their THz imaging systems, wherein the time-domain THz signal is converted to frequency-domain and can be manipulated by using a variety of frequency-domain filters [9]. Thorlabs Inc offers physical THz Bandpass Filters which can be used for filtering out the low and high-frequency spectrum of the THz imaging beam [10]. BATOP GmbH is developing lenses with low absorptions and high Numerical Apertures for enhancing the resolution [11]. Chernomyrdin et al. have proposed a wide-aperture aspherical THz lens for high-resolution imaging. As a result, they could image two point objects spaced at a 0.95, distance providing a contrast of 15% [12]. The latter group has also proposed a solid-immersion imaging technique for enhancing the resolution from 0.85 down to 0.35 factor of the wavelength [13]. Kulya et al. have proposed taking material dispersion into account for enhancing the quality of THz images [14].

SOLUTION TO PROBLEM

This disclosure presents a novel method and system for enhanced-resolution THz imaging whereby the enhanced-resolution image is developed by deconvolution of image that is developed using the signals that are manipulated in time-domain and/or in frequency-domain and a point spread function (PSF) that is developed according to an equation wherein said time-domain and/or frequency-domain signals are input parameters.

SUMMARY

A method and system for developing enhanced-resolution THz images is disclosed. By using this method and system, enhanced-resolution THz images with better quality and resolution than those of the conventional THz images are achieved. By implementing this method, finer features are observable in the resulted image and more accurate measurement is achieved.

ADVANTAGES

Accordingly, several advantages of one or more aspects are as follows: to provide a system and process for developing THz images with higher resolution, diagnosis of smaller defects in packaged objects and unpackaged items, achieving higher accuracy in noninvasive measurements of the features inside packaged items and in unpackaged items, achieving noninvasive imaging of finer features inside packaged and in unpackaged items, improving the certainty of authentication of items and detection of counterfeit items, improving the accuracy and certainty of medical diagnosis in THz imaging. Other advantages of one or more aspects will be apparent from a consideration of the drawings and ensuring description.

DRAWINGS

Figures

In the drawings, closely related figures have the same number but different alphabetic suffixes.

Note that in the THz images 1 pixel is equivalent to 50 μm.

FIG. 1. Illustrates a block diagram of a system and process flow for: data acquisition, implementation of the disclosed resolution enhancement method, and displaying and/or storing the resulted enhanced-resolution THz image.

Figure 2:
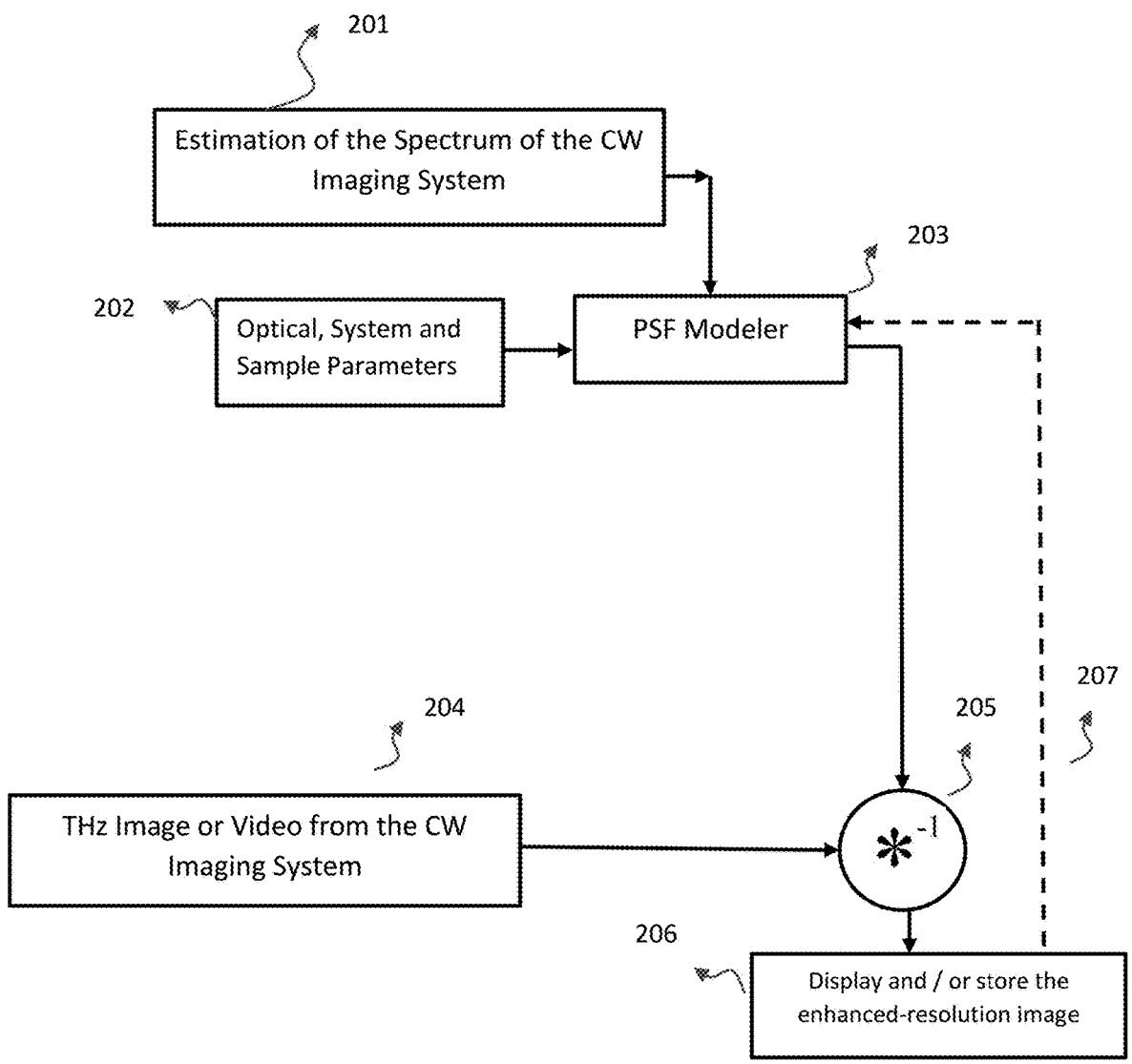

FIG. 2. Illustrates the system of FIG. 1 implementable on continues-wave (CW) imaging systems.

Figure 3:
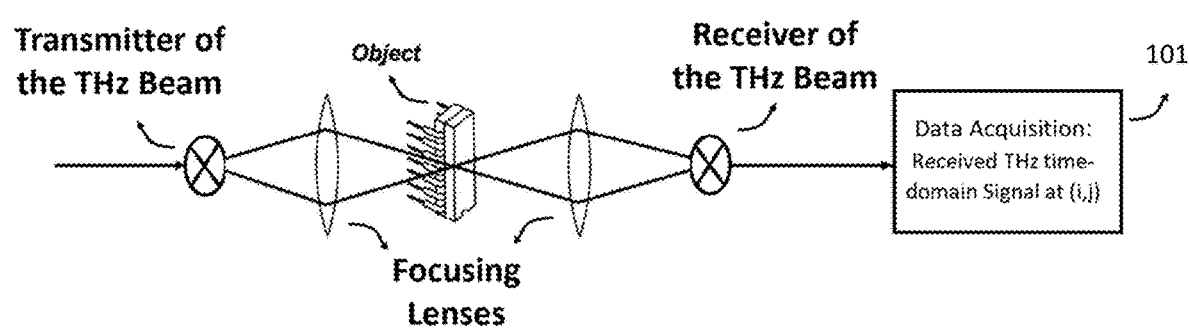
Figure 3:
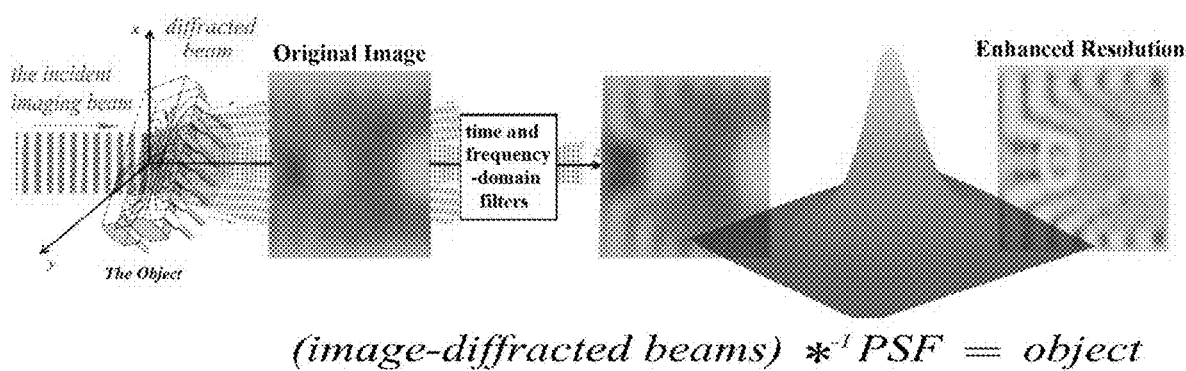

FIG. 3 A. Illustrates a simplified block diagram of an illustrative terahertz imaging system in accordance with the principles of the prior art invention (U.S. Pat. No. 5,623, 145), the location of the object in the system for developing a transmission image of the object, and connection of this system to the system of FIG. 1 through block 101. For achieving THz images in reflection mode, the Receiver of the THz Beam can be placed in front of the reflected beams. In such a case, the reflected beams can be used for developing the THz image and the system of FIG. 1 can be utilized for processing the reflected beams and achieving the enhanced-resolution image in the reflection mode.

FIG. 3 B. Illustrates the location of the object against the direction of the travel of the THz imaging beam and the interaction of the THz imaging beam and the layers of the object. This illustration is for the case transmitted THz beam is used for developing the image. This Figure is an intuitive graphical abstract for explaining some parts of the process of FIG. 1 and briefing the science behind it. Similarly, reflected beams can be used for developing the THz image and the system of FIG. 1 can be utilized for processing the reflected beams and achieving the enhanced-resolution image as well.

Figure 4:
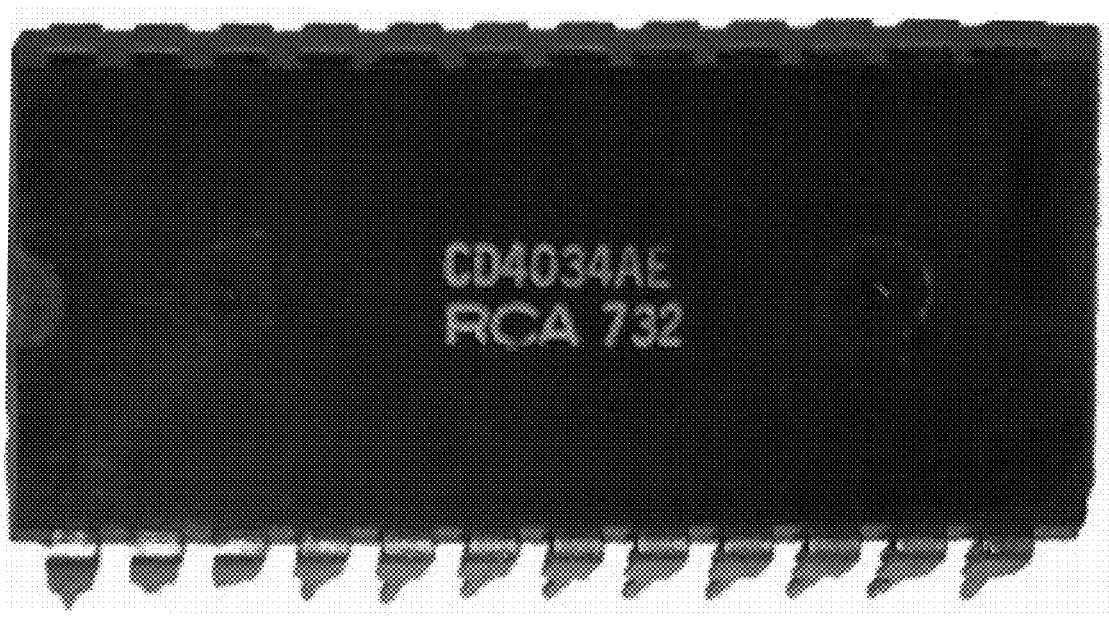
Figure 4:
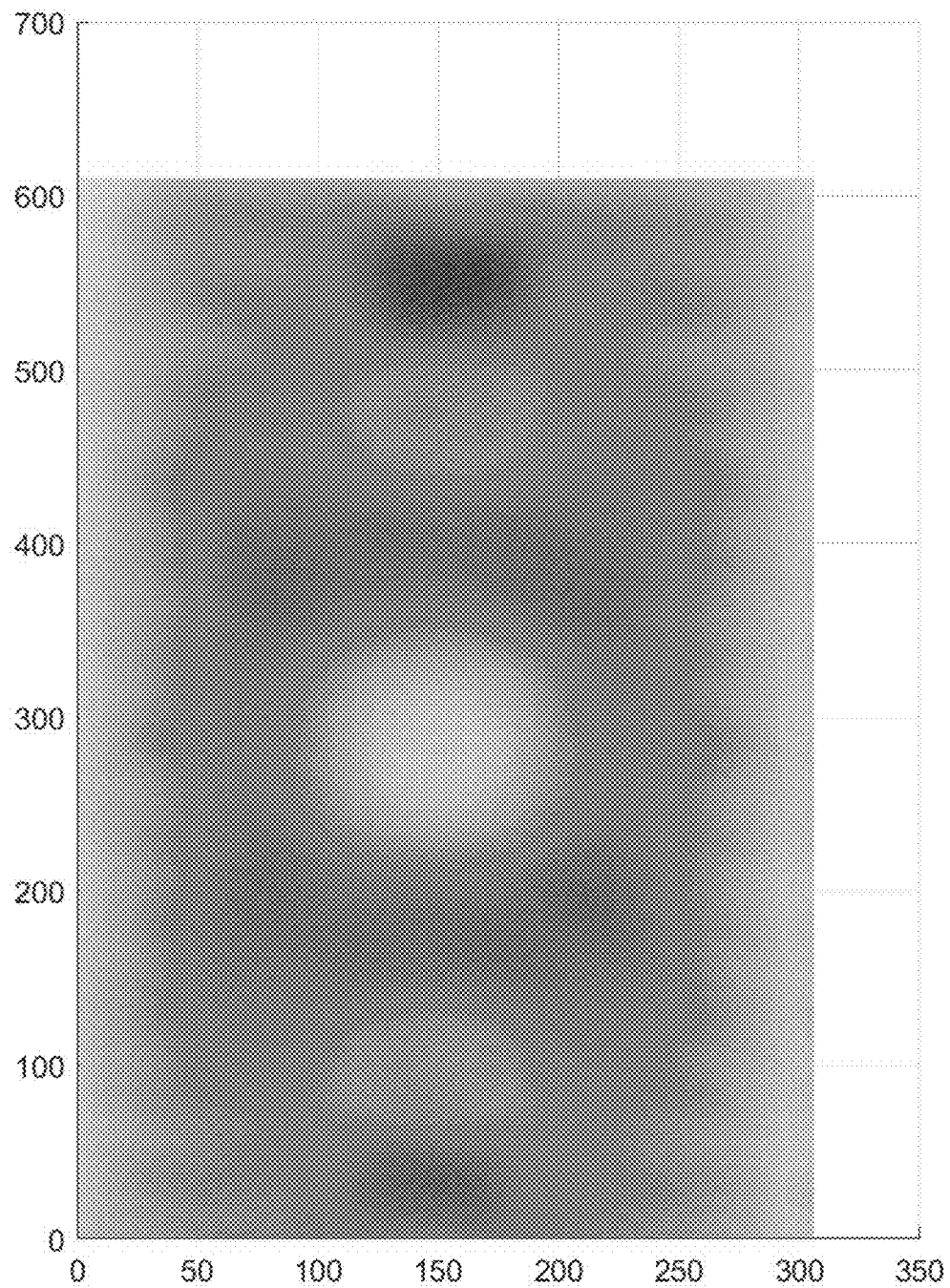
Figure 4:
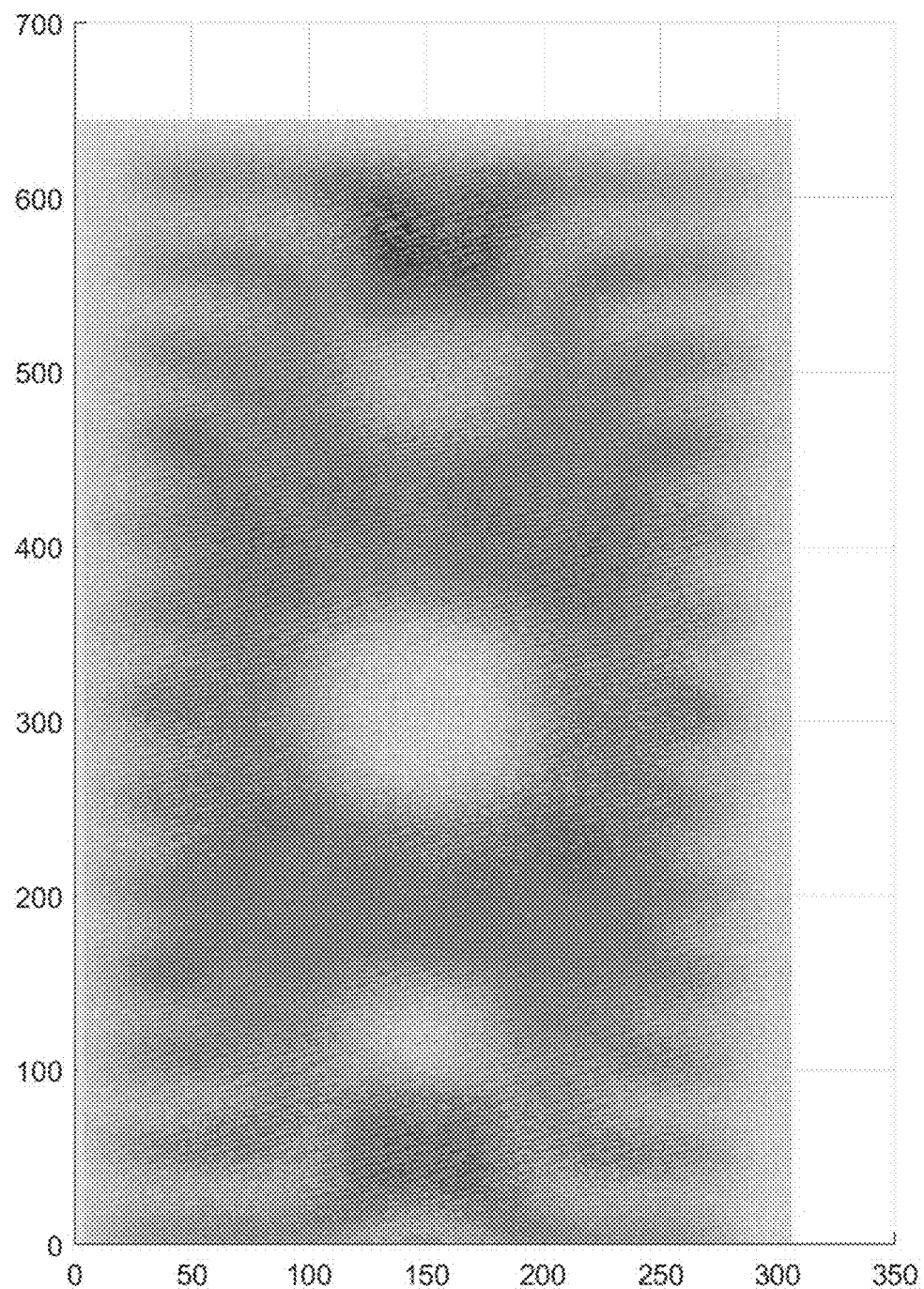
Figure 4:
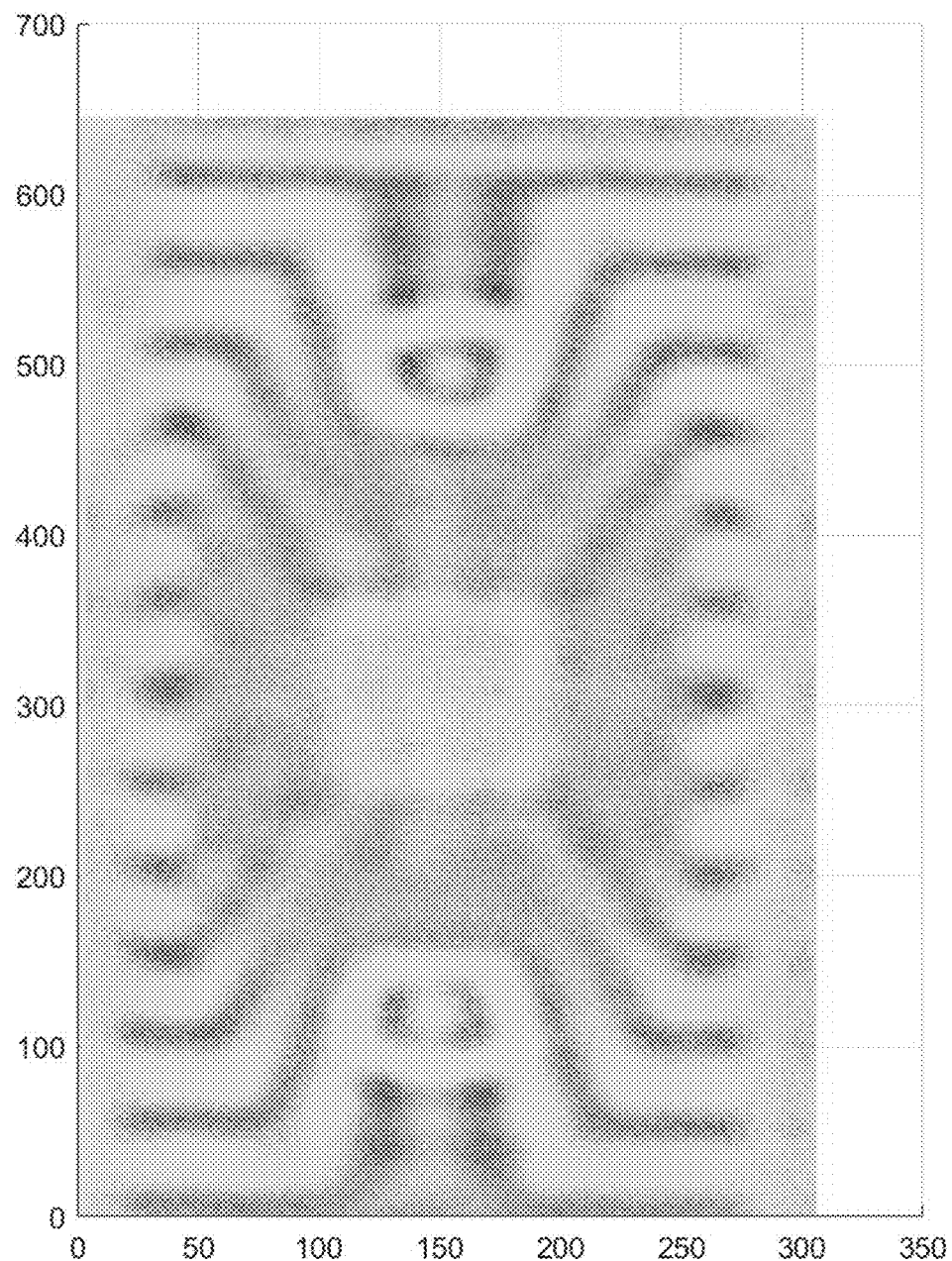
Figure 4:
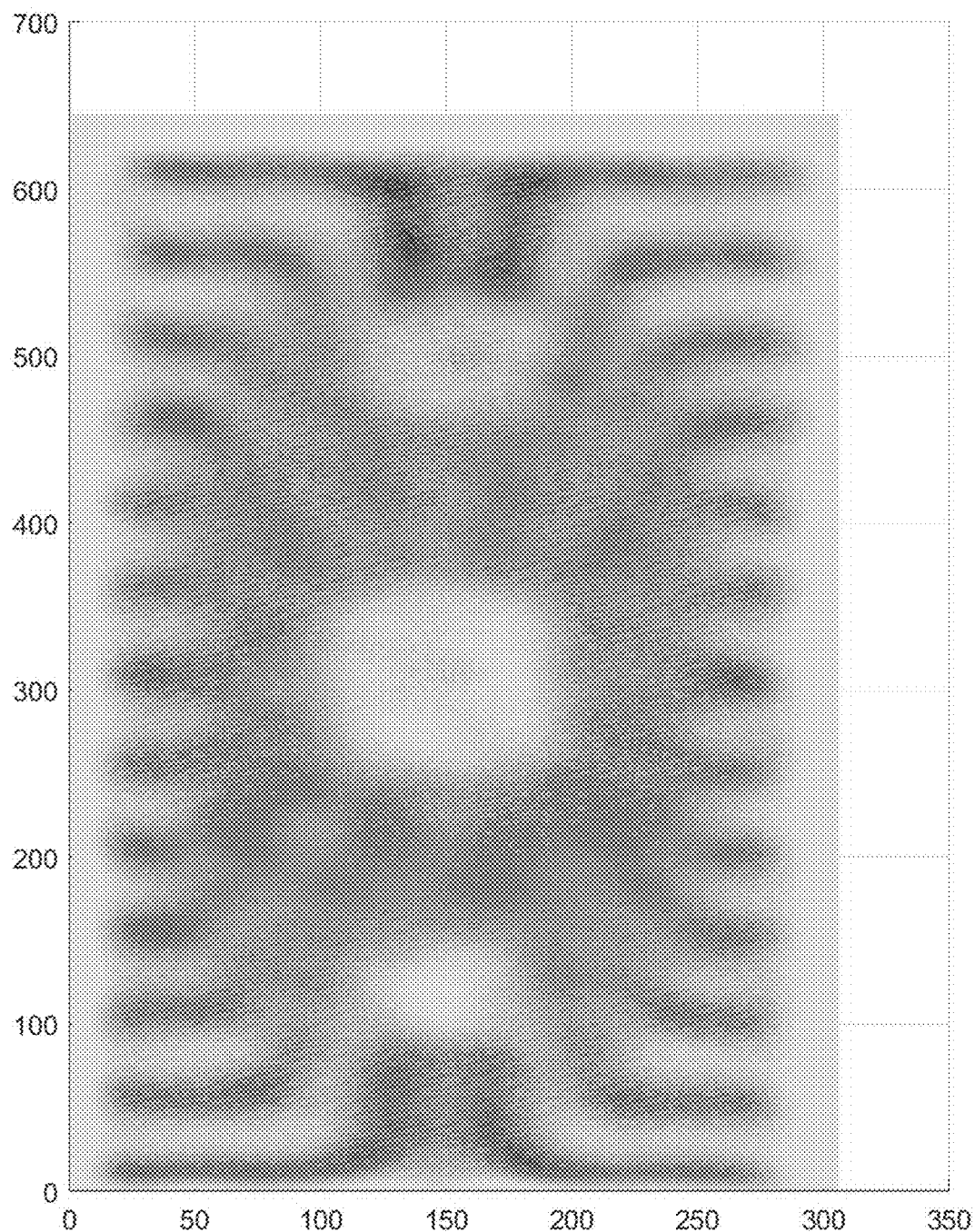
Figure 4:
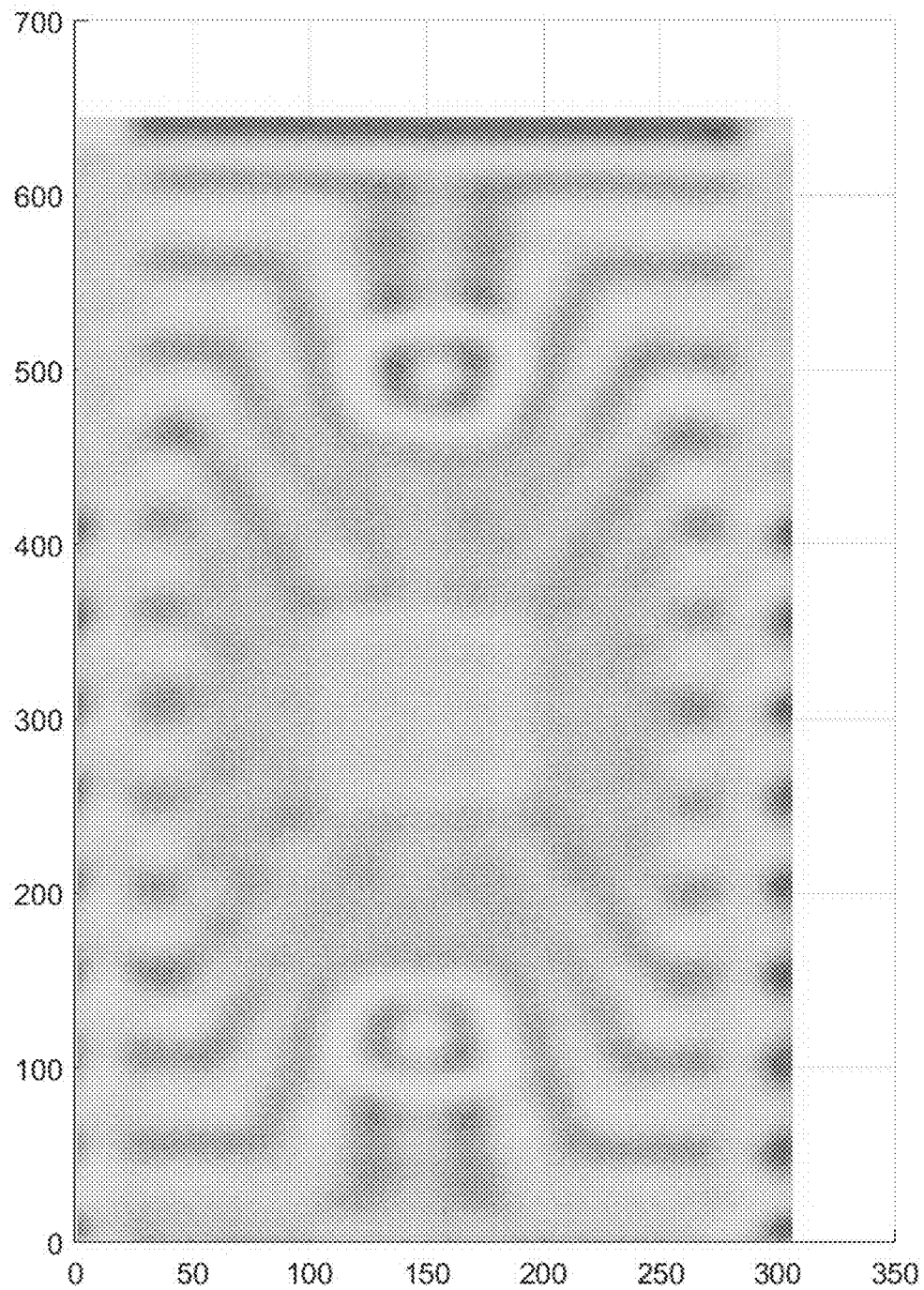
Figure 4:
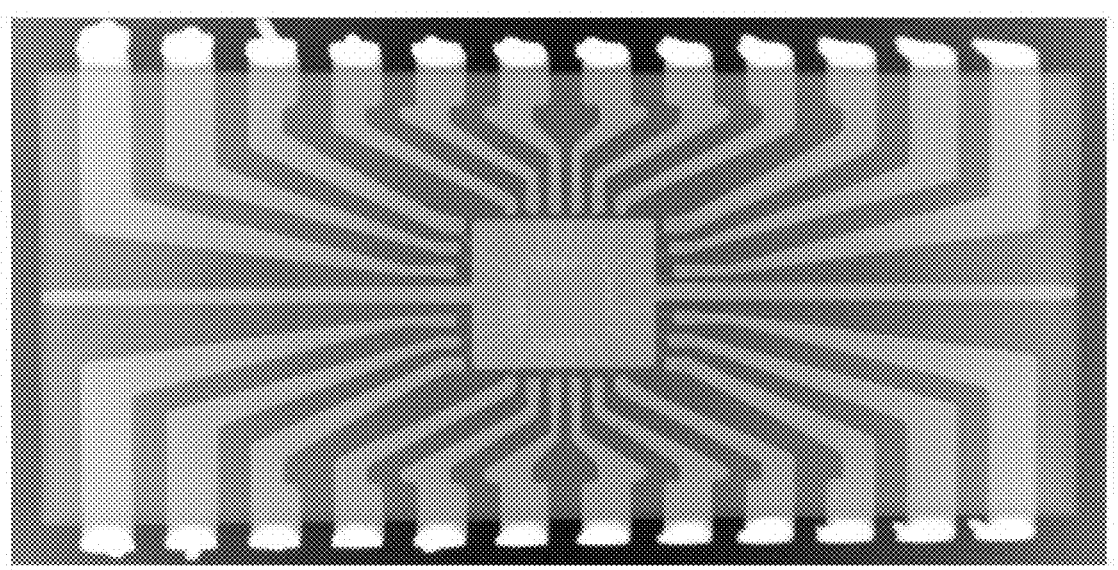
Figure 4:
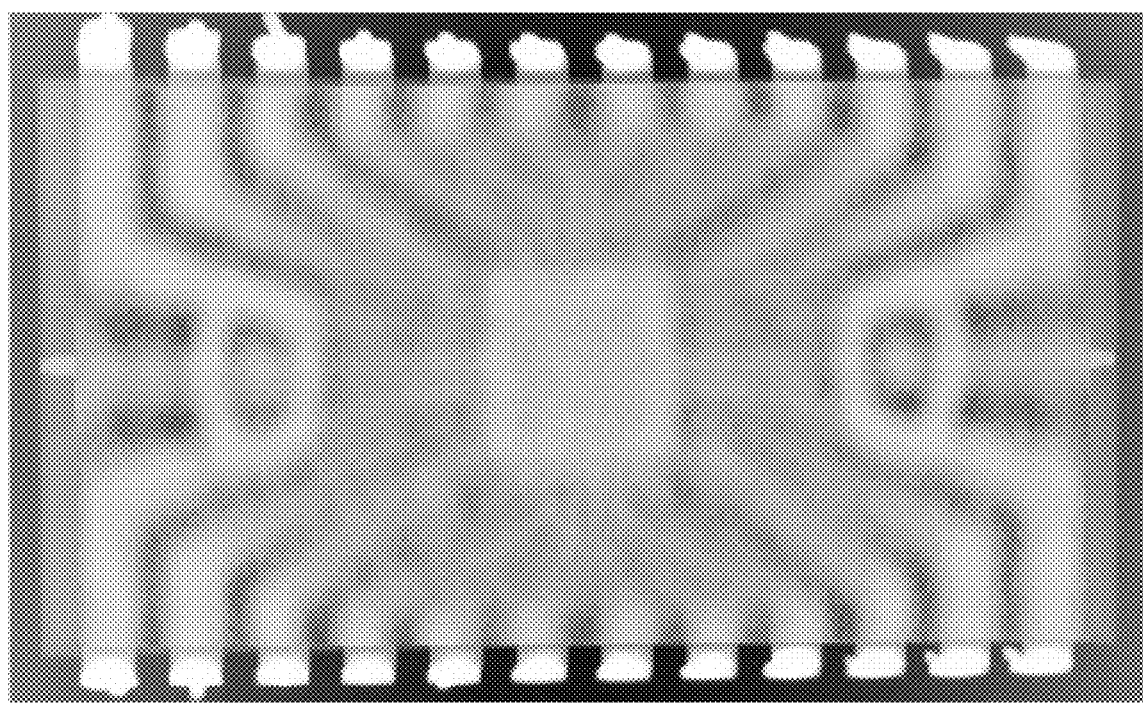
Figure 4:
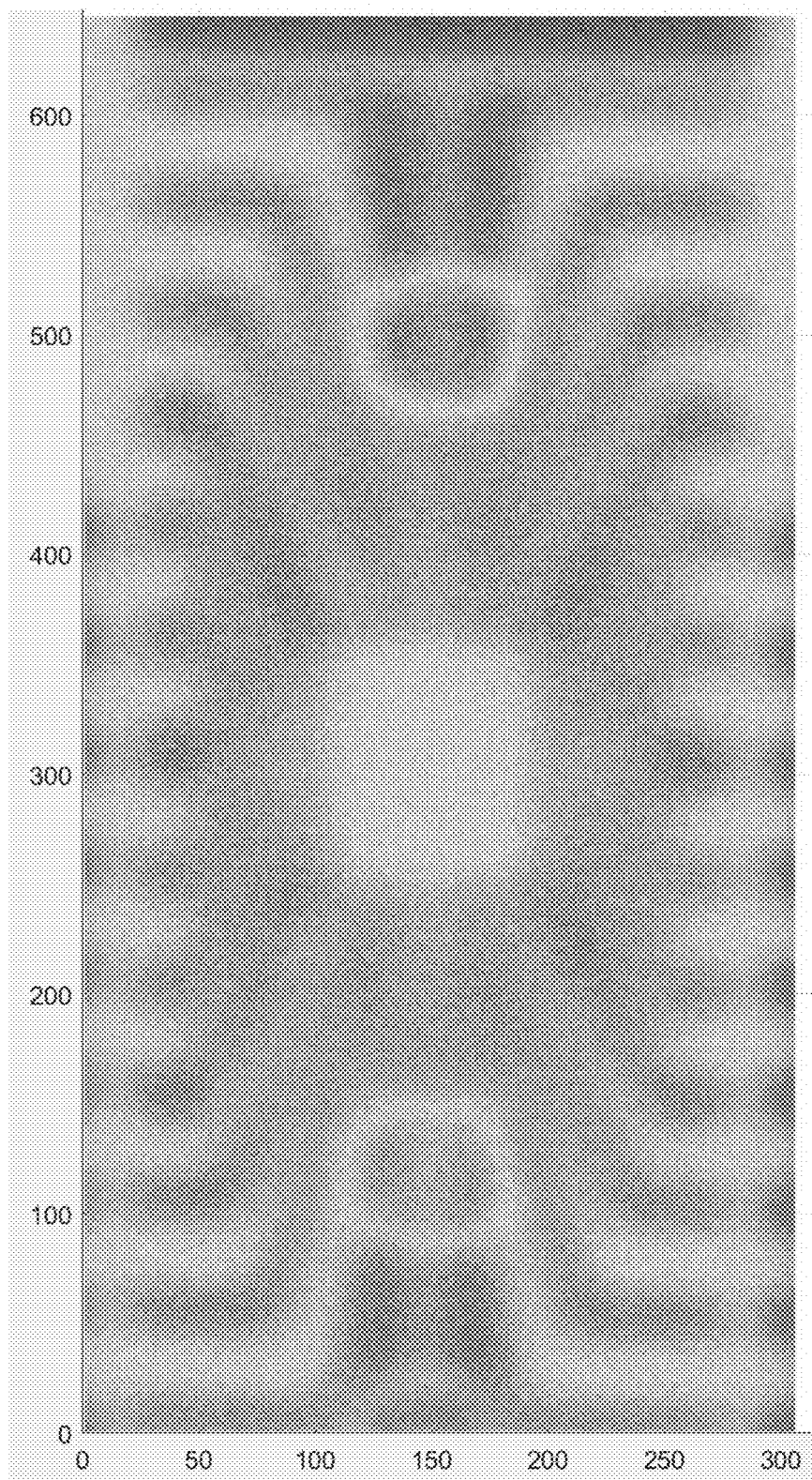
Figure 4:
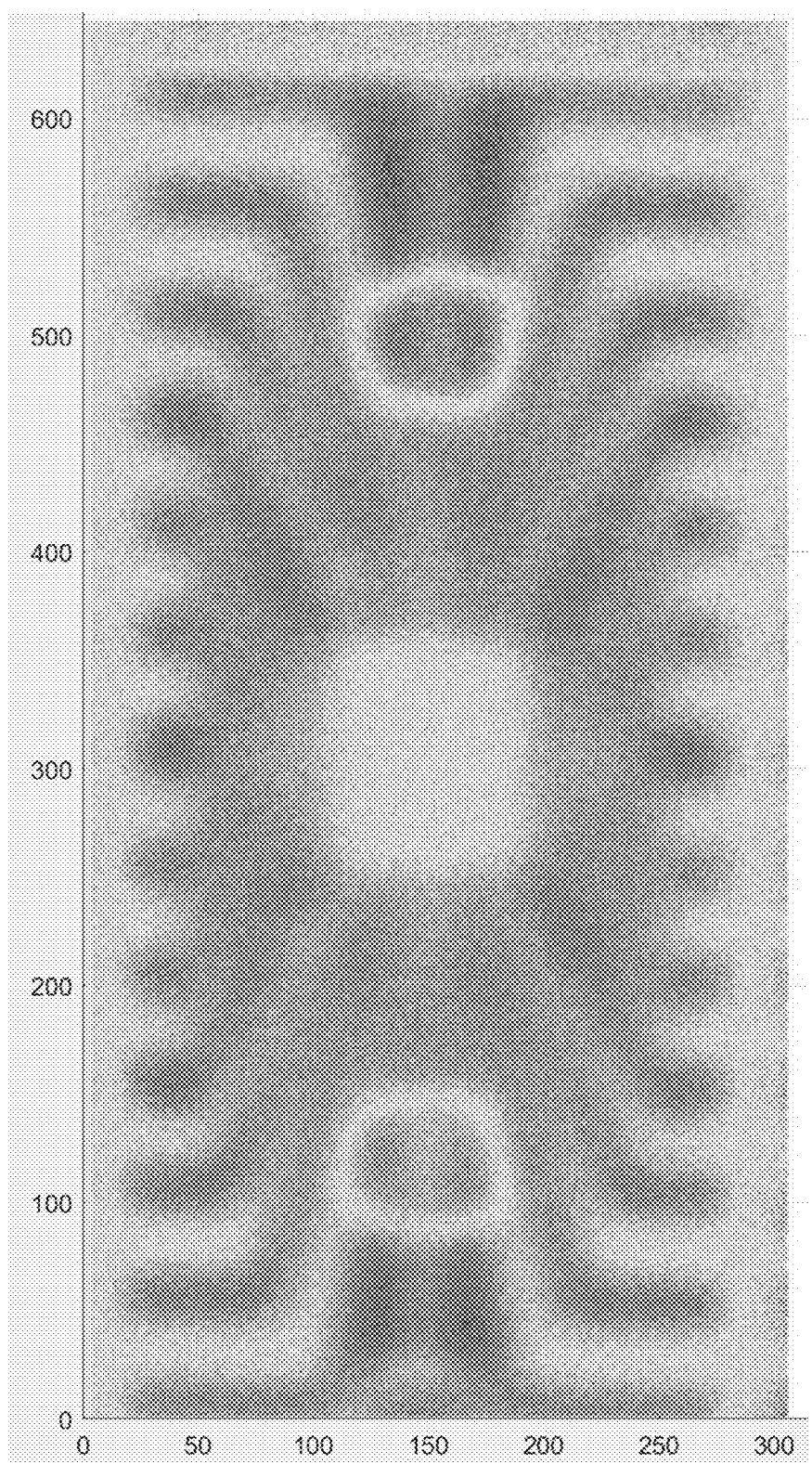

FIG. 4 A. Illustrates the visible light image of Sample 1.

FIG. 4 B. Illustrates the conventional THz image of Sample 1, developed by Equation (17).

FIG. 4 C. Illustrates the THz image of Sample 1 developed by Equation (18).

FIG. 4 D. Illustrates the output of the system of FIG. 1 for Sample 1.

FIG. 4 E. Illustrates the output of the system of FIG. 1 in case BPF (Band-Pass Filtering) is not applied (only time-domain diffraction suppression (Equation 18) and deconvolution of the THz image and PSF are applied) for Sample 1.

FIG. 4 F. Illustrates the output of the system of FIG. 1 in case Equation (17) is used in block 108 instead of Equation (18): as can be seen in this image the quality of the image is lower and it contains artifacts compared with the image in FIG. 4 D.

FIG. 4 G. Illustrates the X-ray image of Sample 1.

FIG. 4 H. Illustrates an image formed by overlaying said enhanced-resolution THz image (the image in FIG. 4 D.) and X-ray image (the image in FIG. 4 G.) of Sample 1: confirming the accuracy of the high-resolution THz image.

FIG. 4 I. Illustrates the THz image of Sample 1 where only frequency-domain BPF (in 103) is applied and Equation (17) is used for developing the image (deconvolution and time-domain diffraction suppression (Equation (18)) are not applied). The resolution and quality of this image is lower than the enhanced-resolution image in FIG. 4 D. where the entire system of FIG. 1 is used to develop the image.

FIG. 4 J. Illustrates the THz image of Sample 1 where only BPF (in 103) and time-domain diffraction suppression (Equation (18) in 108) is used. The resolution and quality of this image is higher than the image in FIG. 4 I. where only BPF was applied. The resolution and quality of this image is lower than the enhanced-resolution image in FIG. 4 D. where the entire system of FIG. 1 was used to develop the image.

Figure 5:
Figure 5:
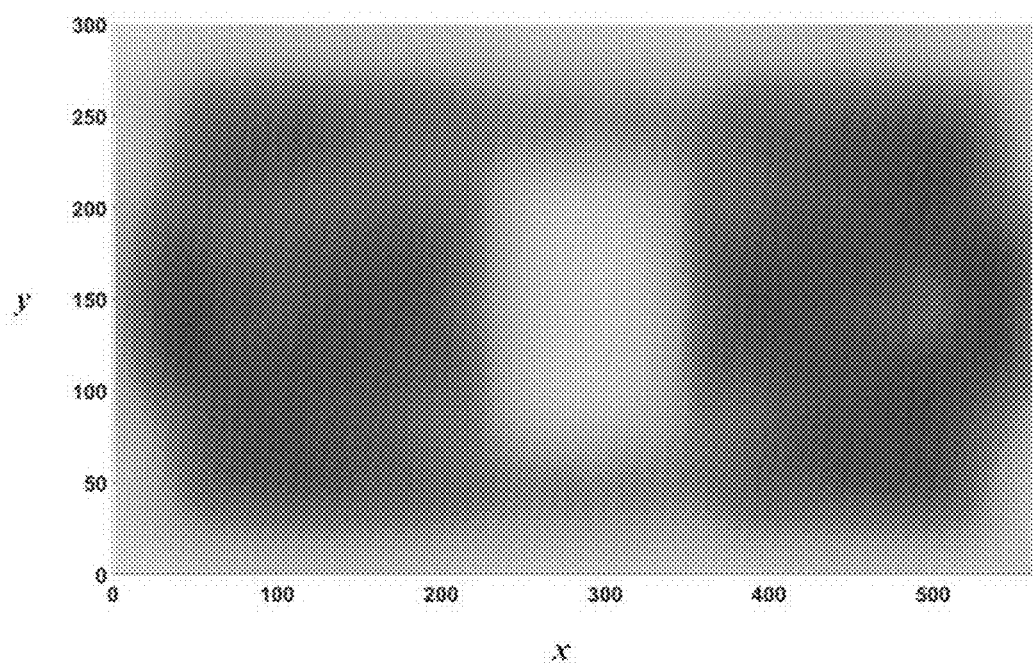
Figure 5:
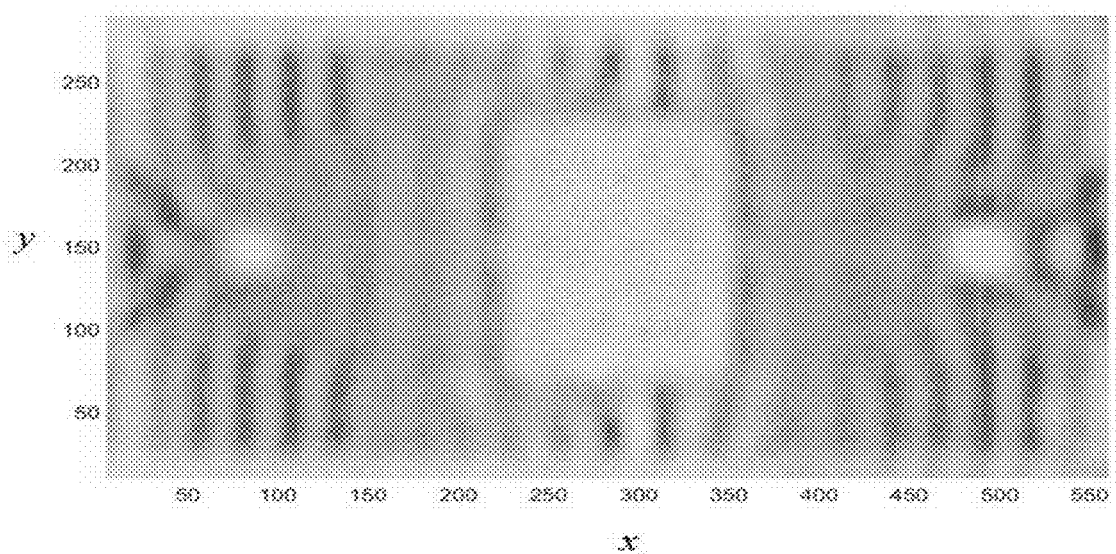
Figure 5:
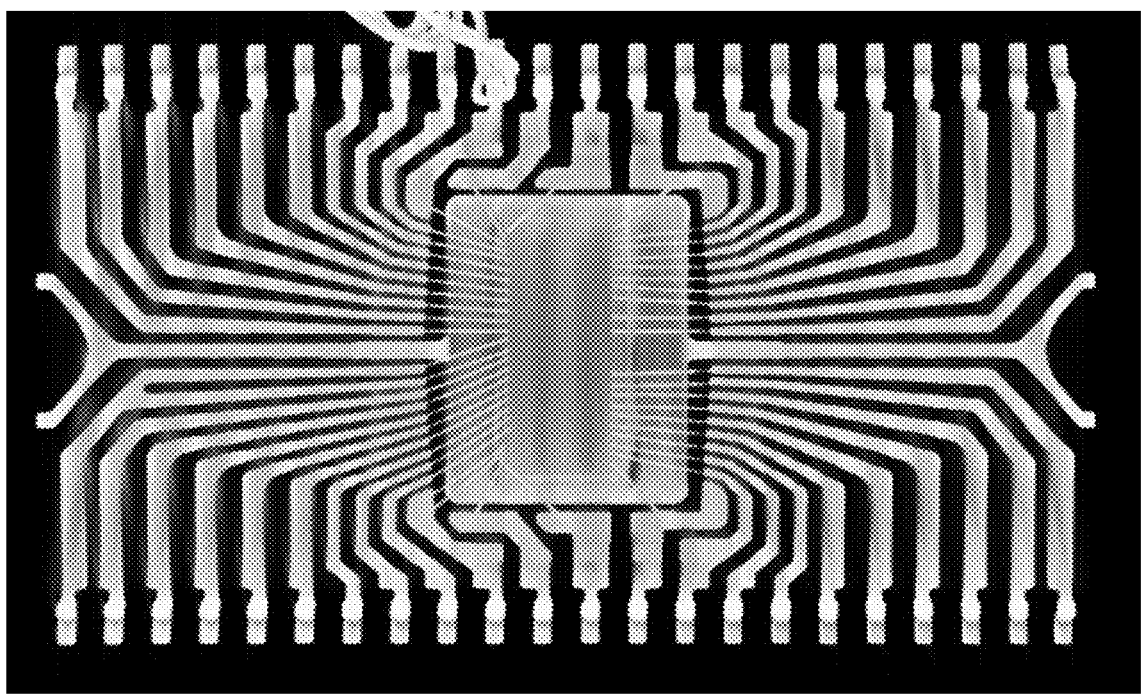
Figure 5:
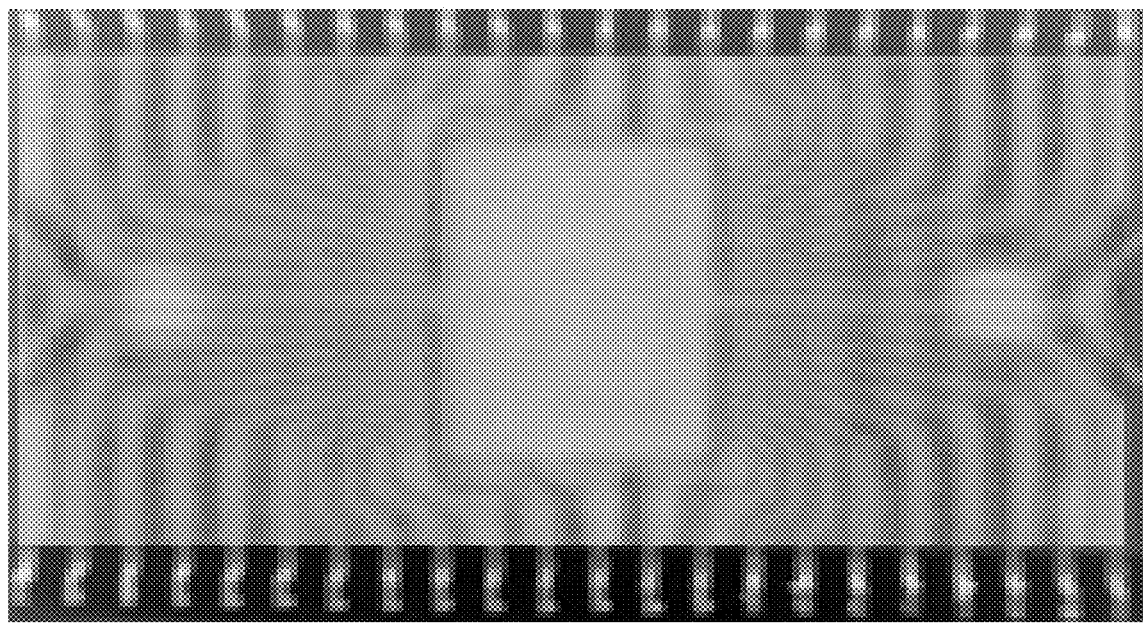
Figure 5:
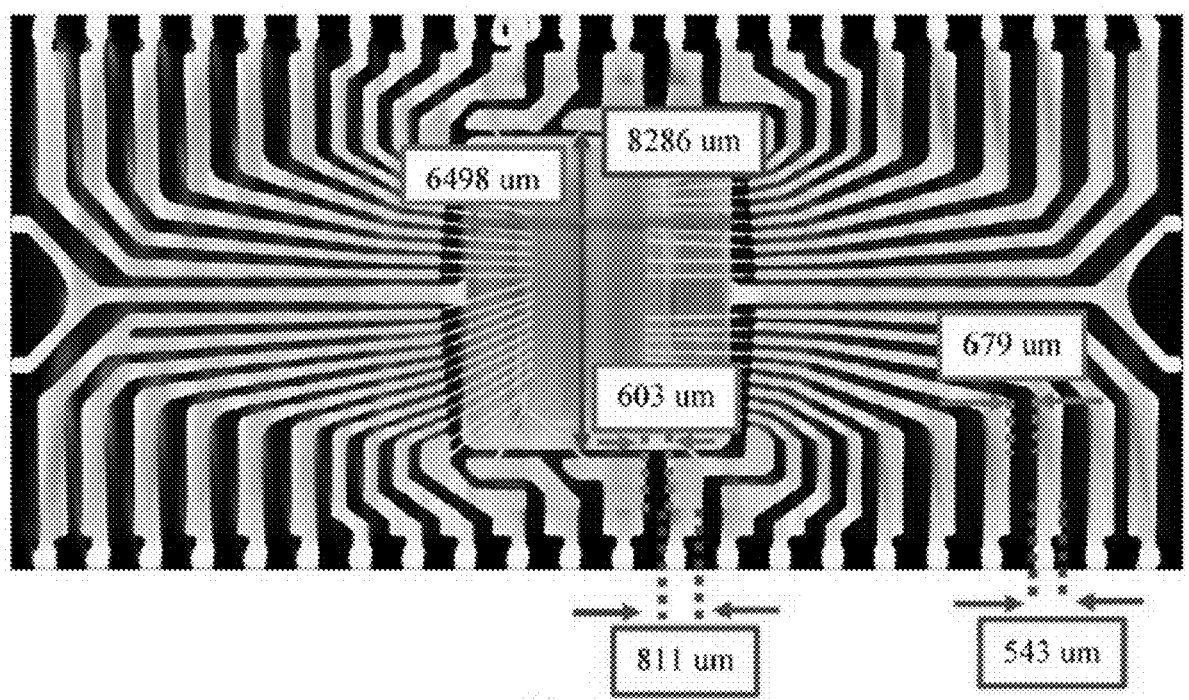
Figure 5:
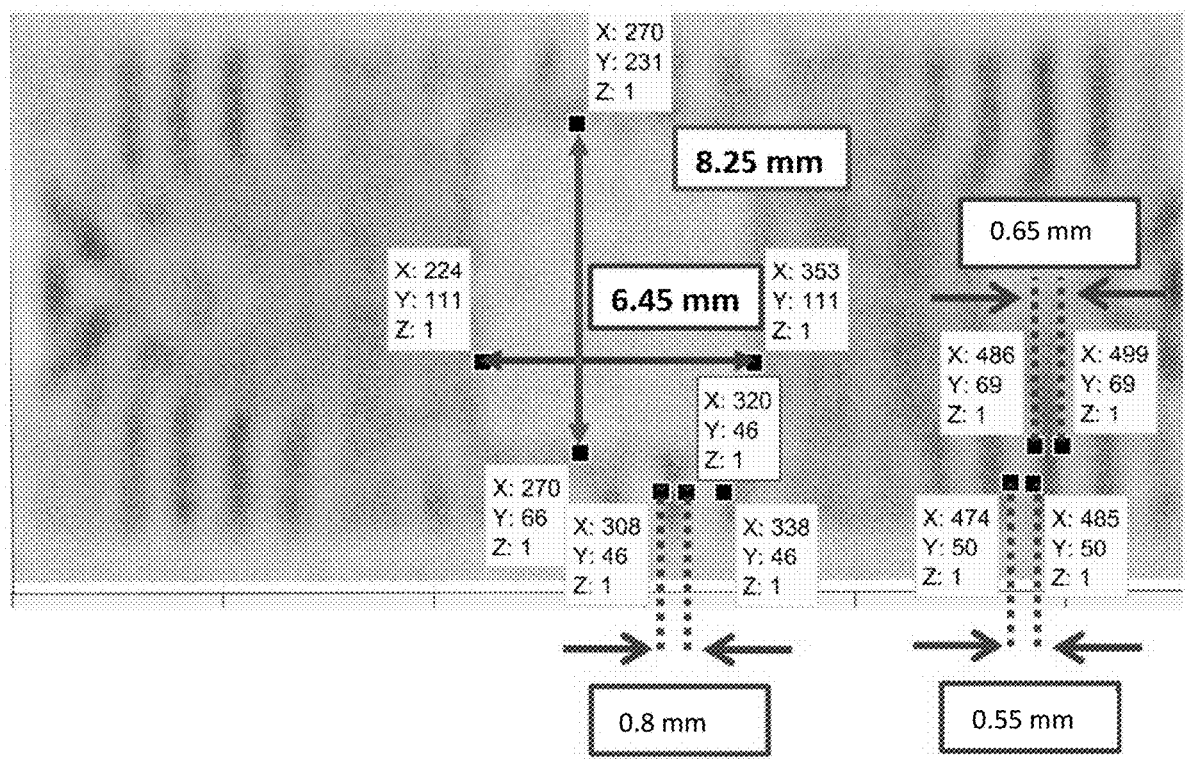
Figure 5:
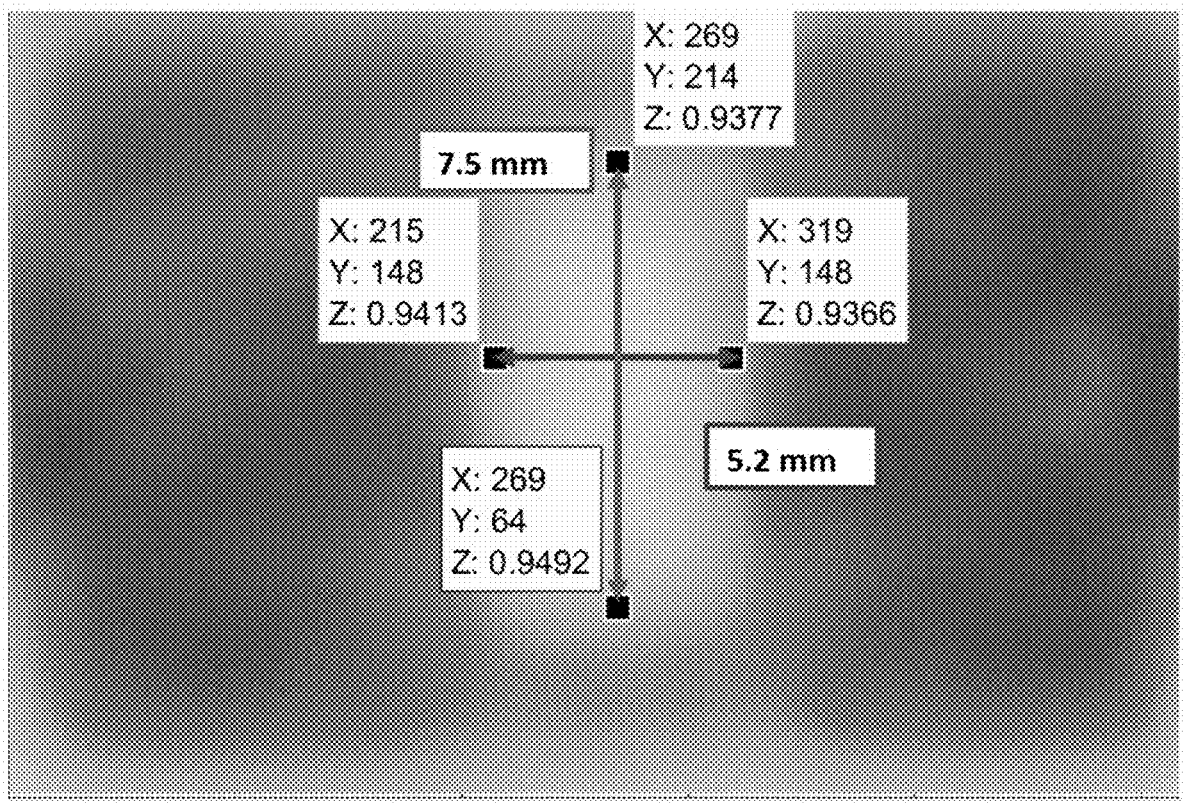
Figure 5:
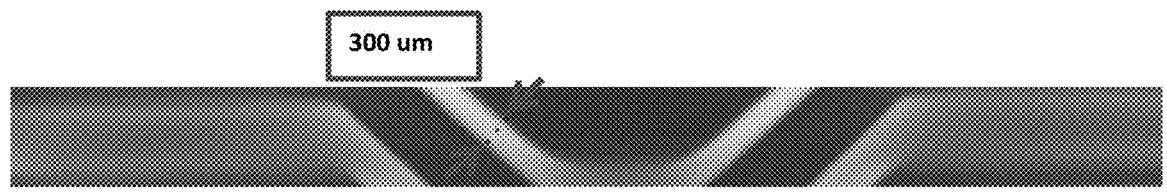
Figure 5:
Figure 5:

FIG. 5 A. Illustrates the visible light image of Sample 2.

FIG. 5 B. Illustrates the conventional THz image of Sample 2 developed according to Equation (17).

FIG. 5 C. Illustrates the enhanced-resolution THz image of Sample 2 (the output of the system of FIG. 1 for Sample 2).

FIG. 5 D. Illustrates the X-ray image of Sample 2.

FIG. 5 E. Illustrates an image formed by overlaying said enhanced-resolution THz image (the image in FIG. 5 C.) and X-ray image (the image in FIG. 5 D.) of Sample 2: confirming the accuracy of the enhanced-resolution THz image.

FIG. 5 F. Illustrate the X-ray image of Sample 2 with measured features on it.

FIG. 5 G. Illustrates the enhanced-resolution THz image (output of the system of FIG. 1) for Sample 2 and measured features on it.

FIG. 5 H. Illustrates the conventional THz image of Sample 1 (THz image of FIG. 5 B.) with measured features on it.

FIG. 5 I. Illustrates a fine wire in Sample 2 imaged by X-Ray.

FIG. 5 J. Illustrates a fine wire in Sample 2 imaged by the system of FIG. 1

FIG. 5 K. Illustrates the conventional THz image of Sample 2: the fine wire observed in FIG. 5 I. and FIG. 5 J. cannot be observed here due to the poor resolution.

Figure 6:
Figure 6:
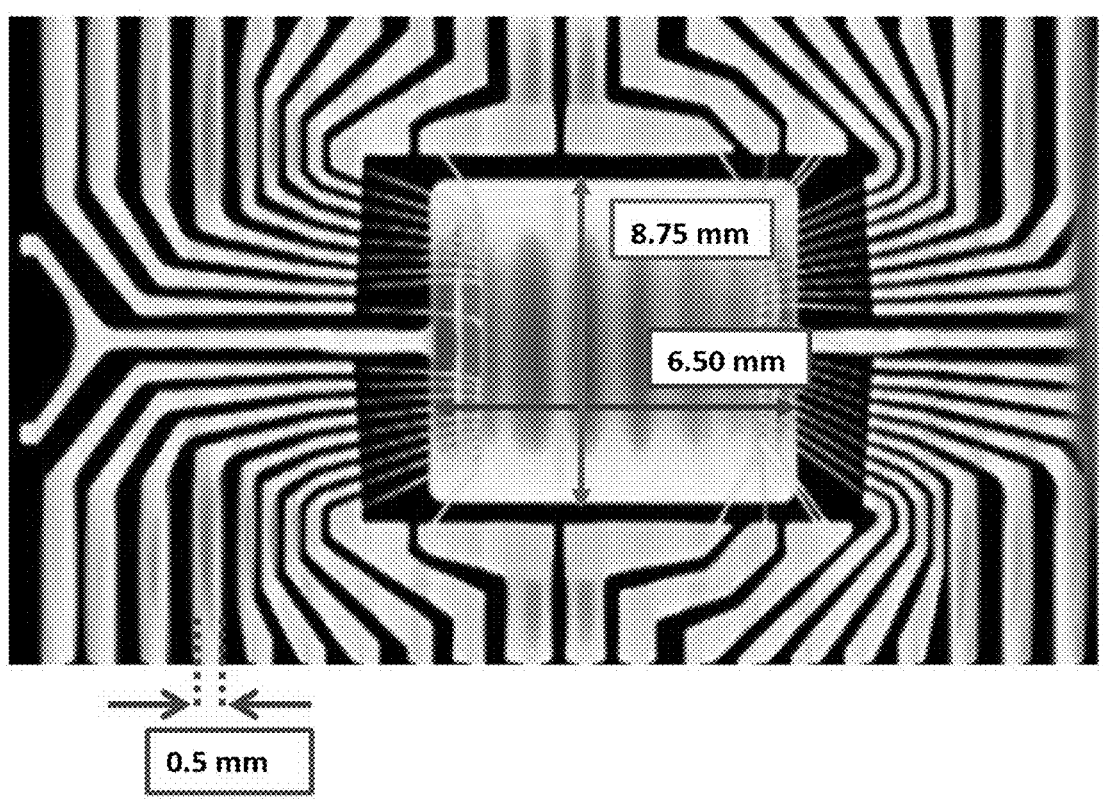
Figure 6:
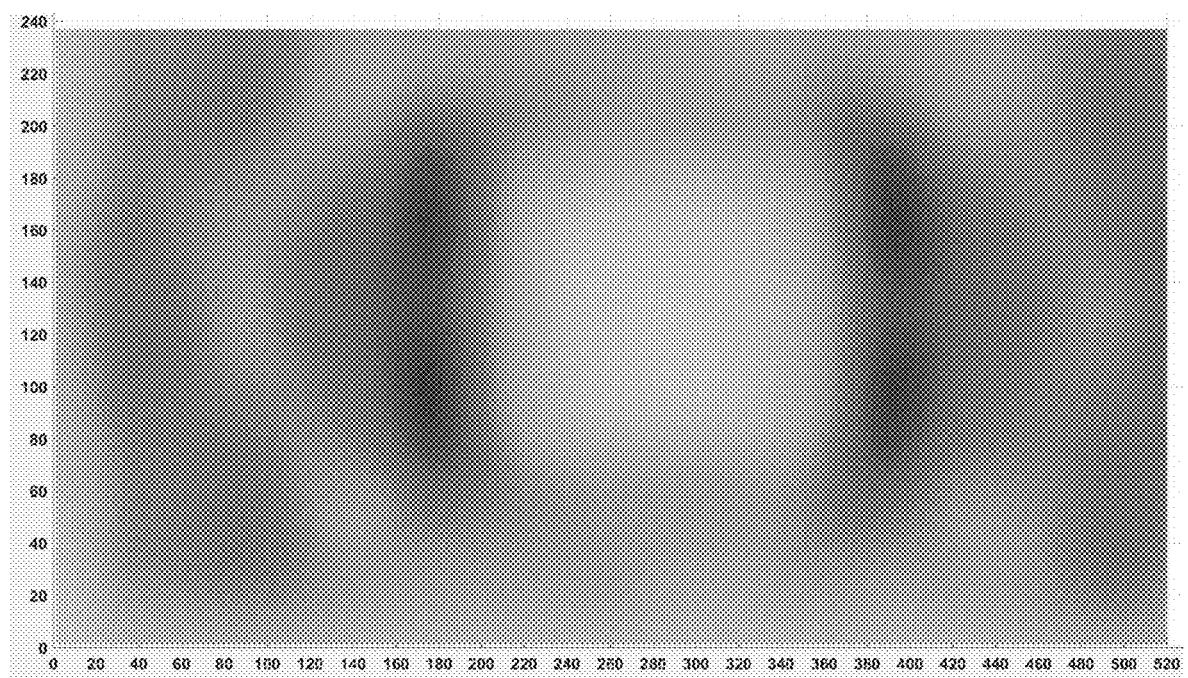
Figure 6:
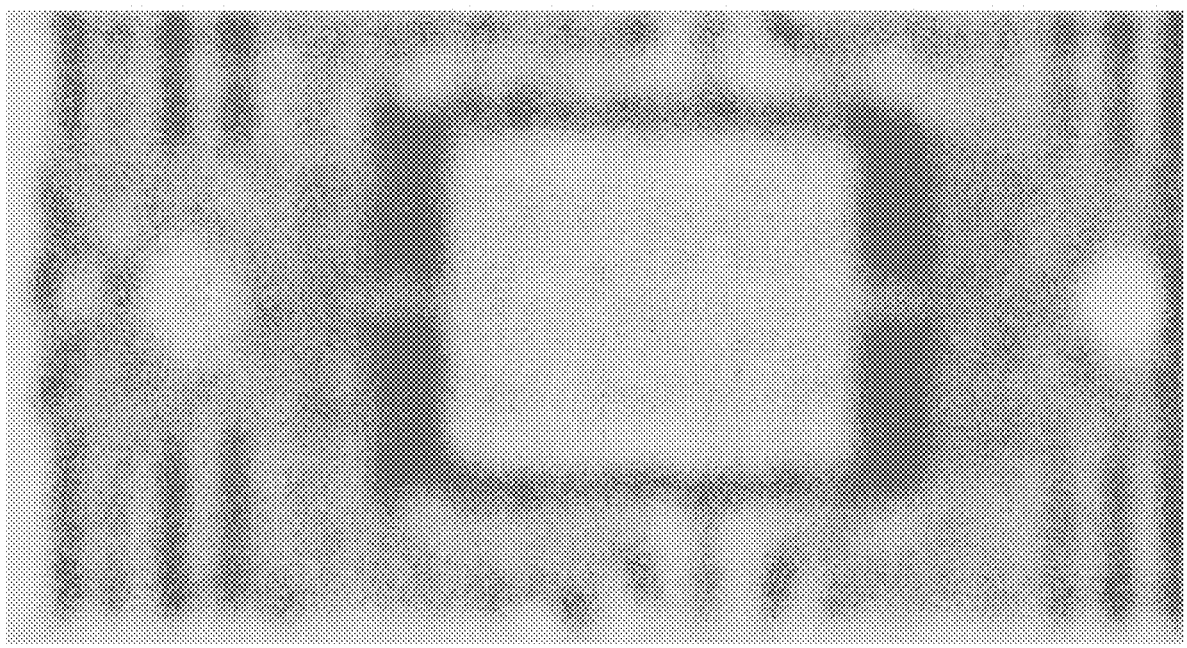
Figure 6:
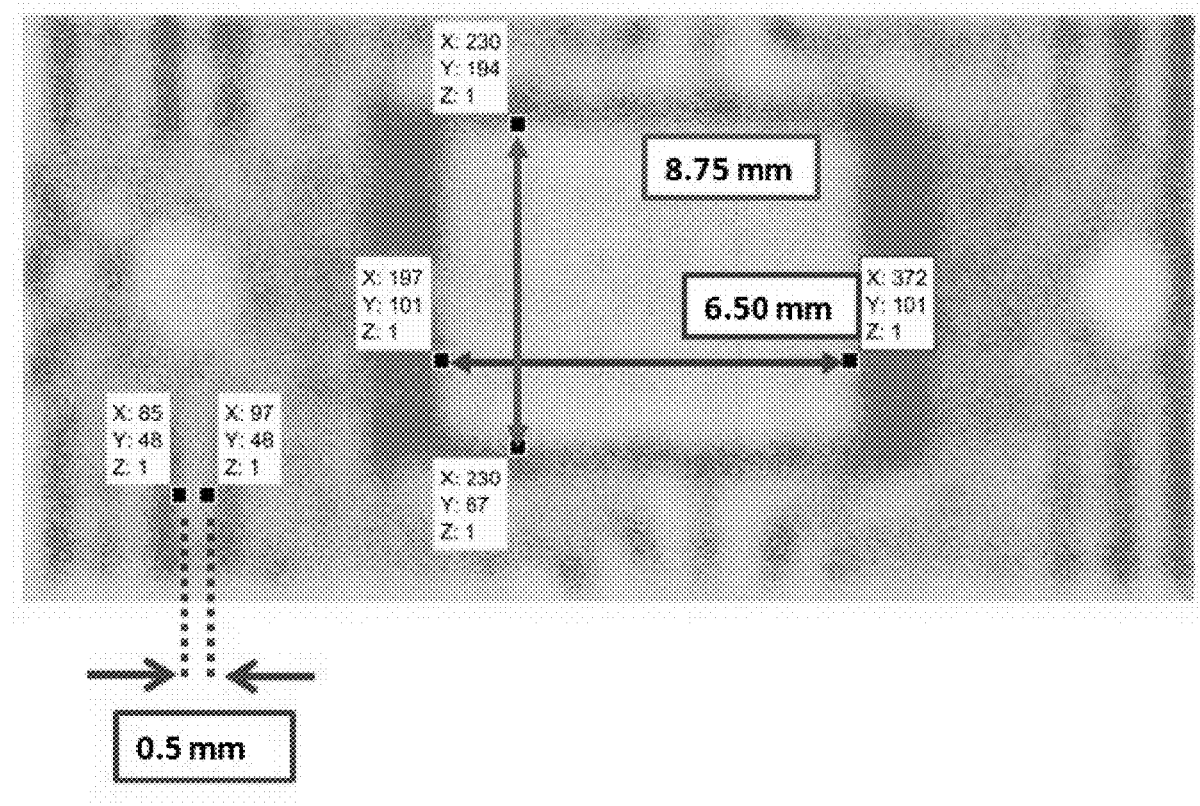

FIG. 6 A. Illustrates the visible light image of Sample 3.

FIG. 6 B. Illustrates the X-ray image of Sample 3 with measured features on it.

FIG. 6 C. Illustrates the THz image of Sample 3 developed using the conventional method (using Equation (17)).

FIG. 6 D. Illustrates the enhanced-resolution THz image of Sample 3 (the output of the system of FIG. 1 for Sample 3).

FIG. 6 E. Illustrates the enhanced-resolution THz image of Sample 3 with measured features on it.

Figure 7:
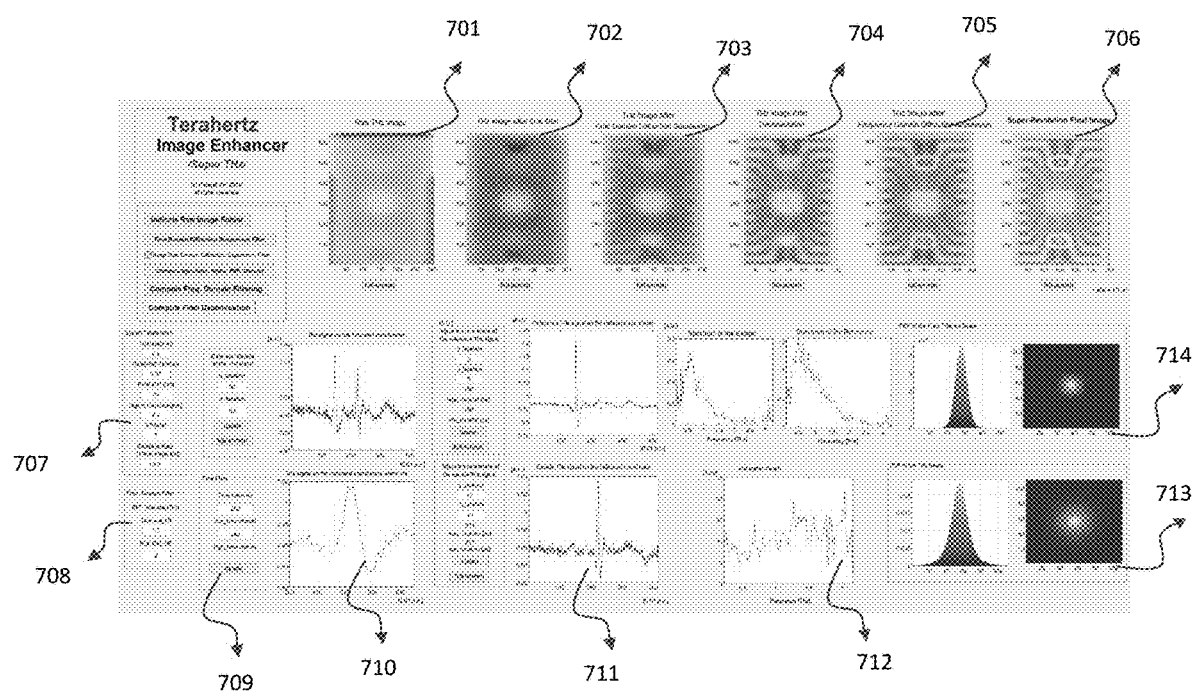
Figure 7:
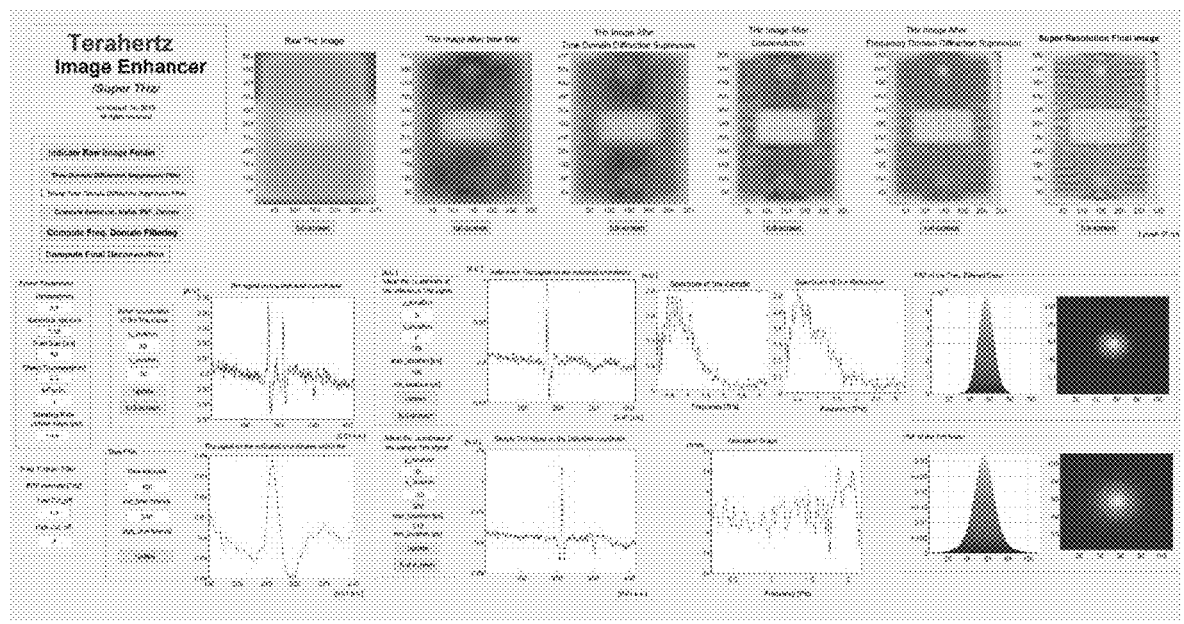
Figure 7:
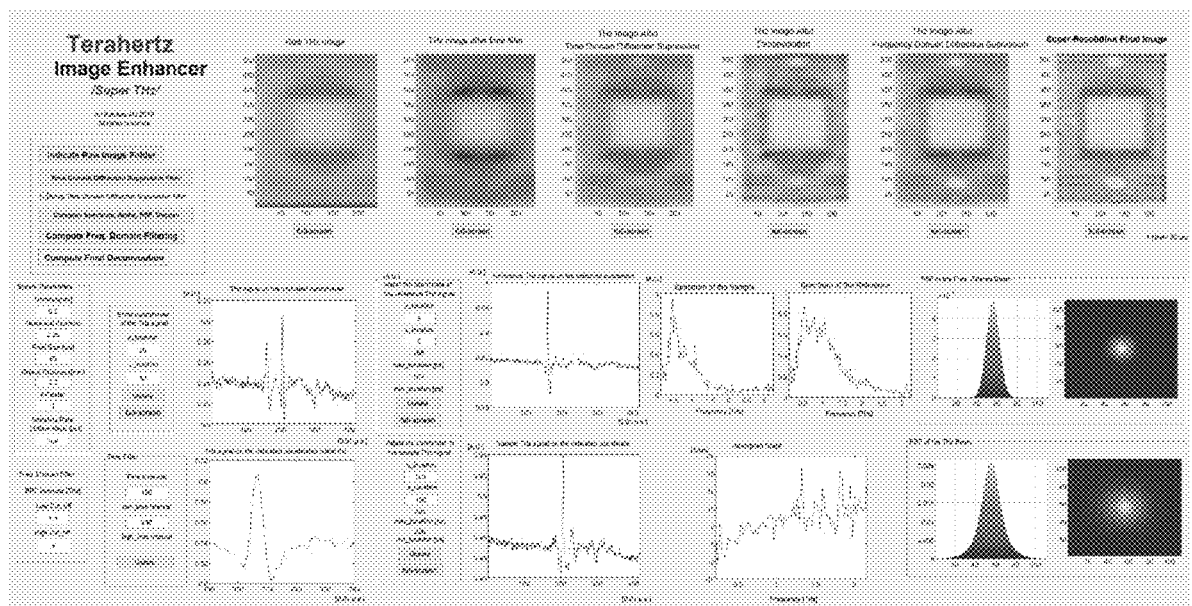

FIG. 7 A. Illustrates a Graphical User Interface (GUI) prototype for operating the system of FIG. 1 implemented by digital computers wherein Sample 1 is processed.

FIG. 7 B. Illustrates a Graphical User Interface (GUI) prototype for operating the system of FIG. 1 implemented by digital computers wherein Sample 2 is processed.

FIG. 7 C. Illustrates a Graphical User Interface (GUI) prototype for operating the system of FIG. 1 implemented by digital computers wherein Sample 3 is processed.

Figure 8:
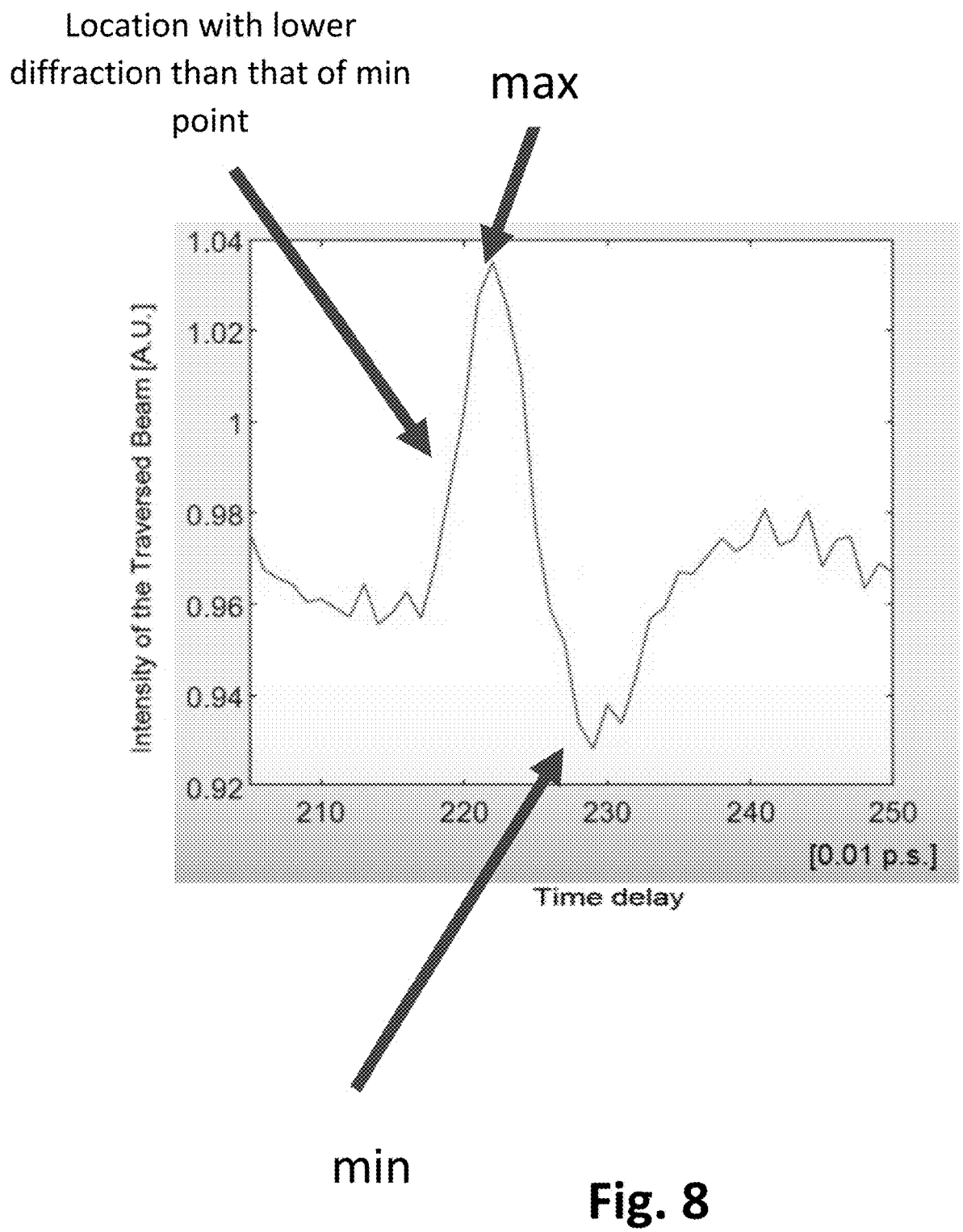

FIG. 8. Illustrates the principle of choosing magnitude of the THz signal at a time delay before the maximum of the THz signal, in accordance with Equation (18).

Figure 9:
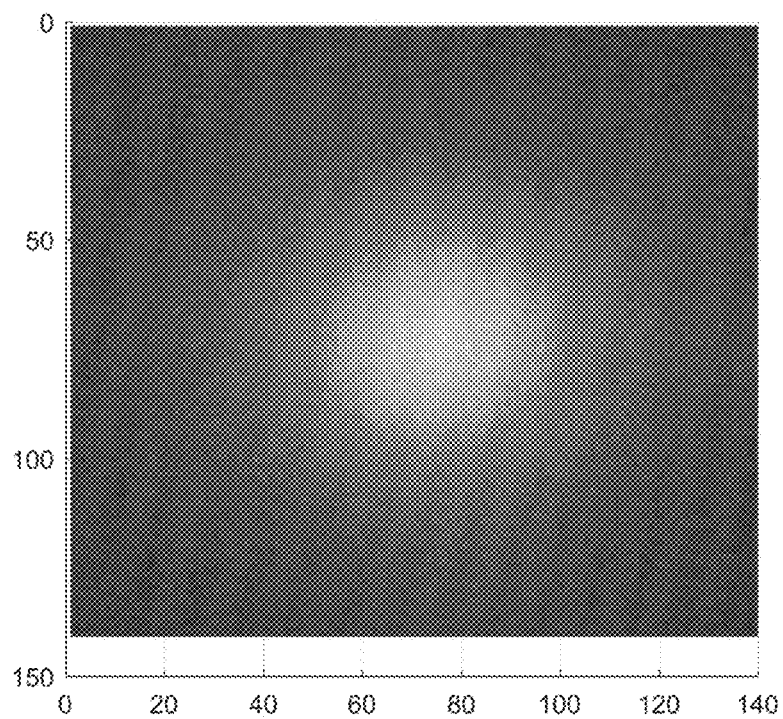
Figure 9:
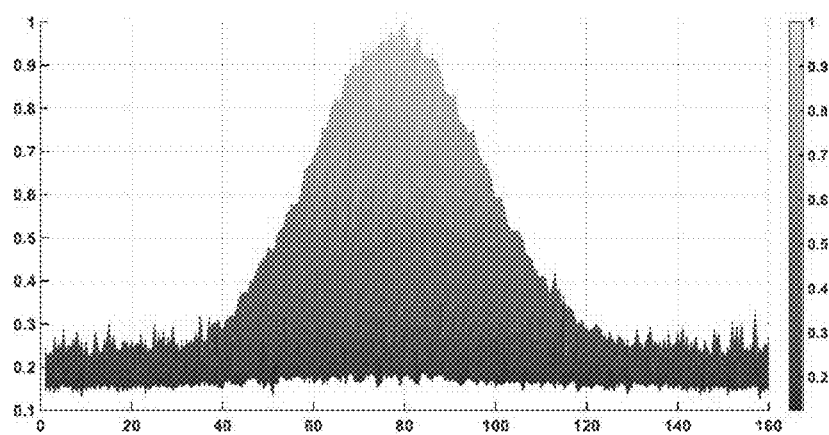

FIG. 9. Illustrates the measured PSF of a THz imaging system.

Figure 10:
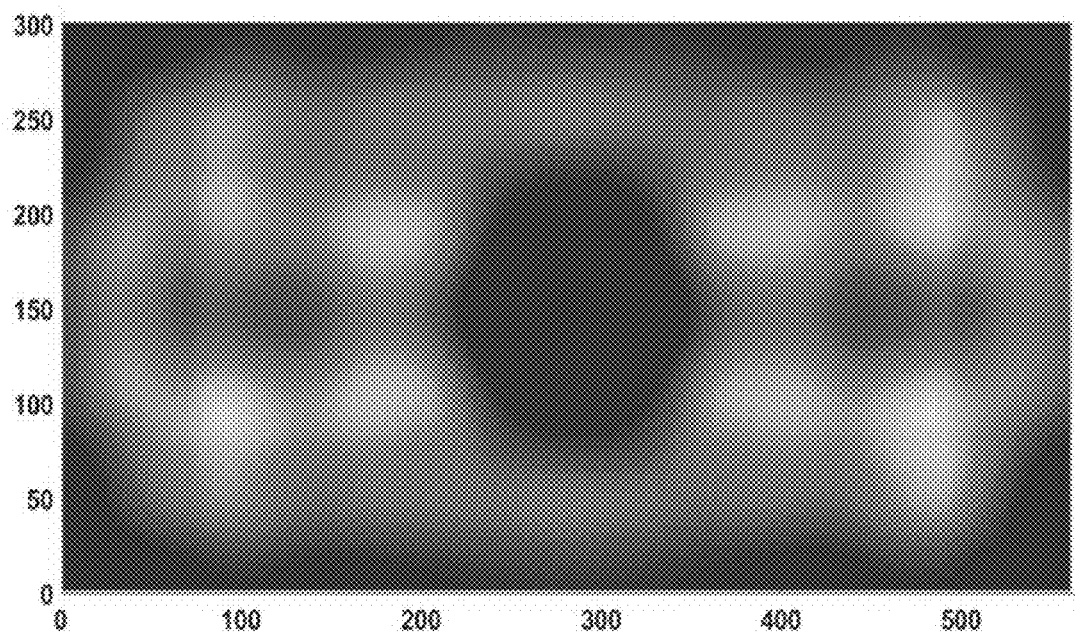

FIG. 10. Illustrates the resulted image from the deconvolution of said measured PSF and the conventional THz image of Sample 2.

Figure 11:
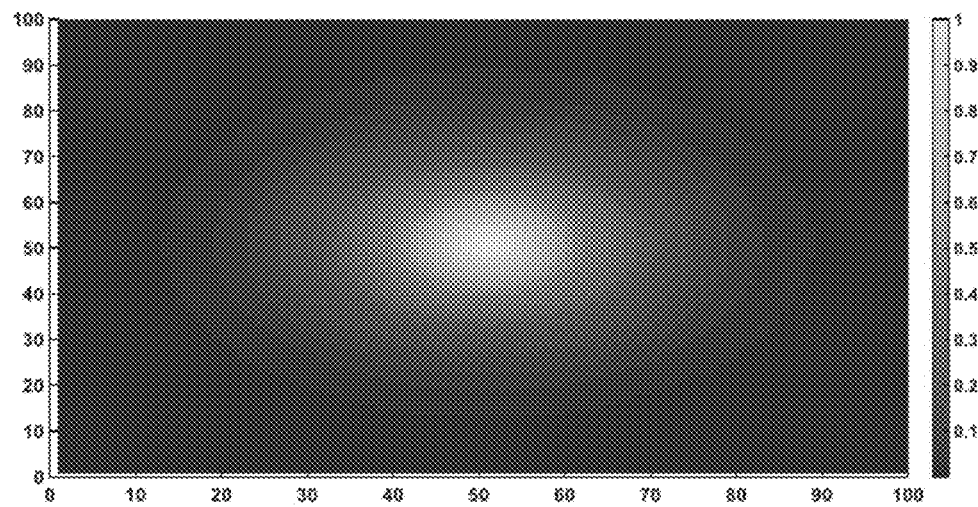
Figure 11:
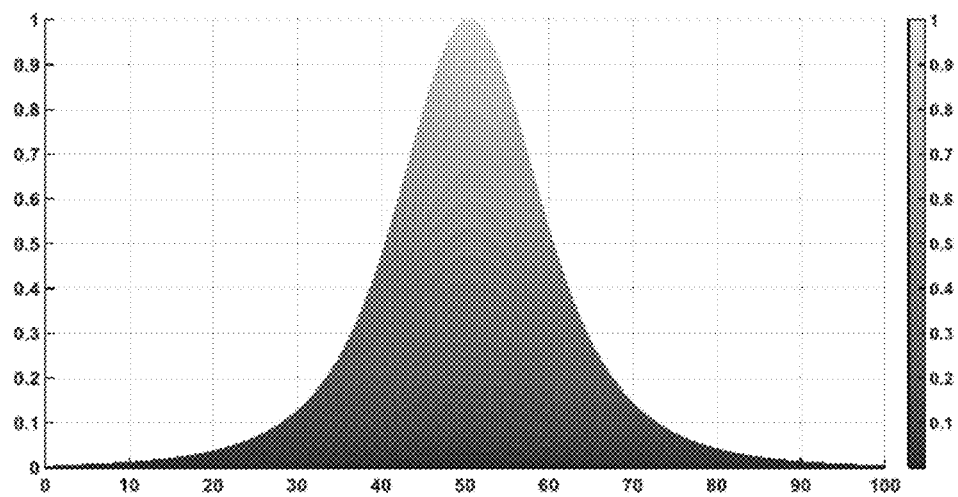

FIG. 11. Illustrates the mathematically modeled PSF of the THz imaging system.

Figure 12:
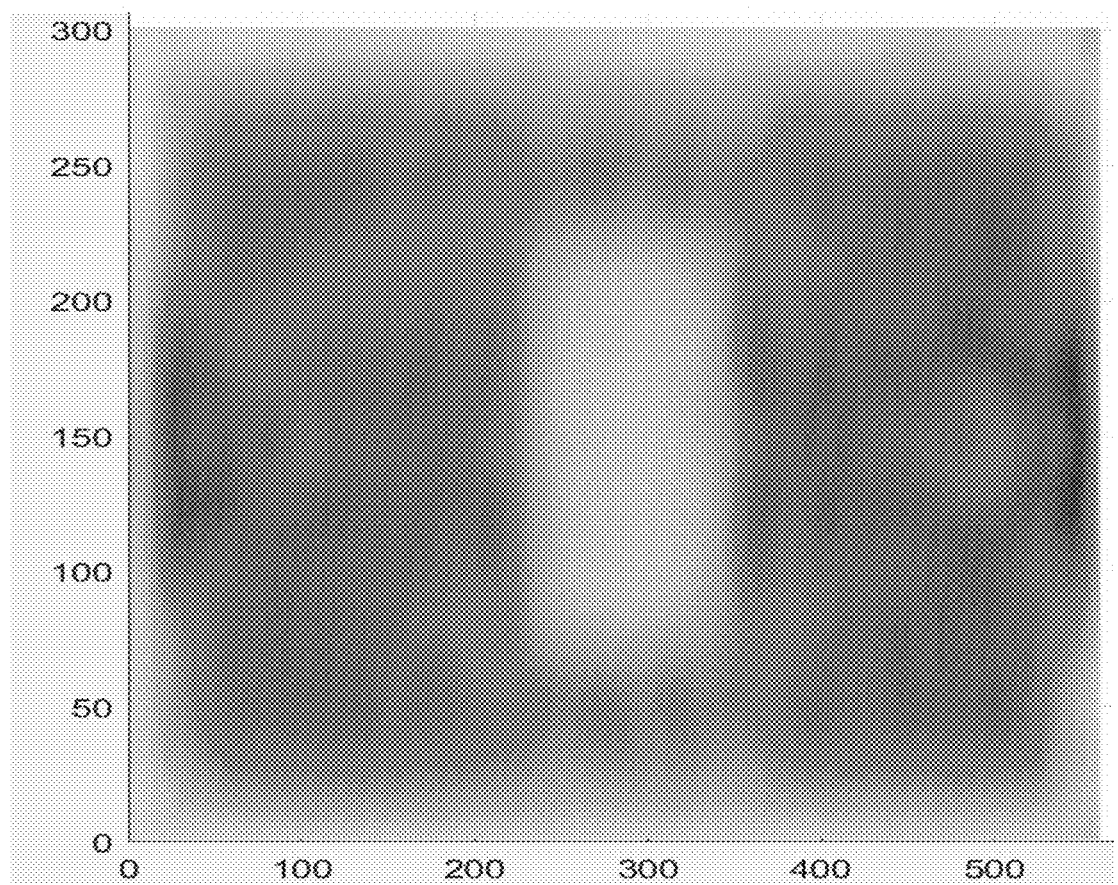

FIG. 12. Illustrates the resulted image from deconvolution of said mathematically modeled PSF and conventional THz image FIG. 13 A. Illustrates the principle of choosing the magnitude of the THz signal at a time delay before the maximum of the THz signal, in accordance with Equation (21).

Figure 13:
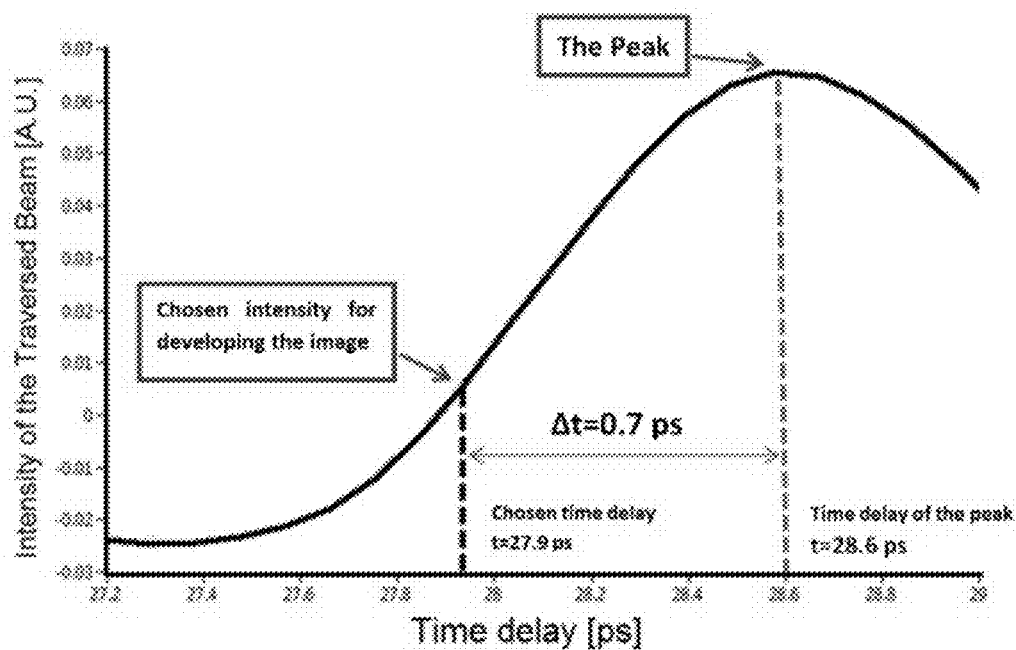
Figure 13:
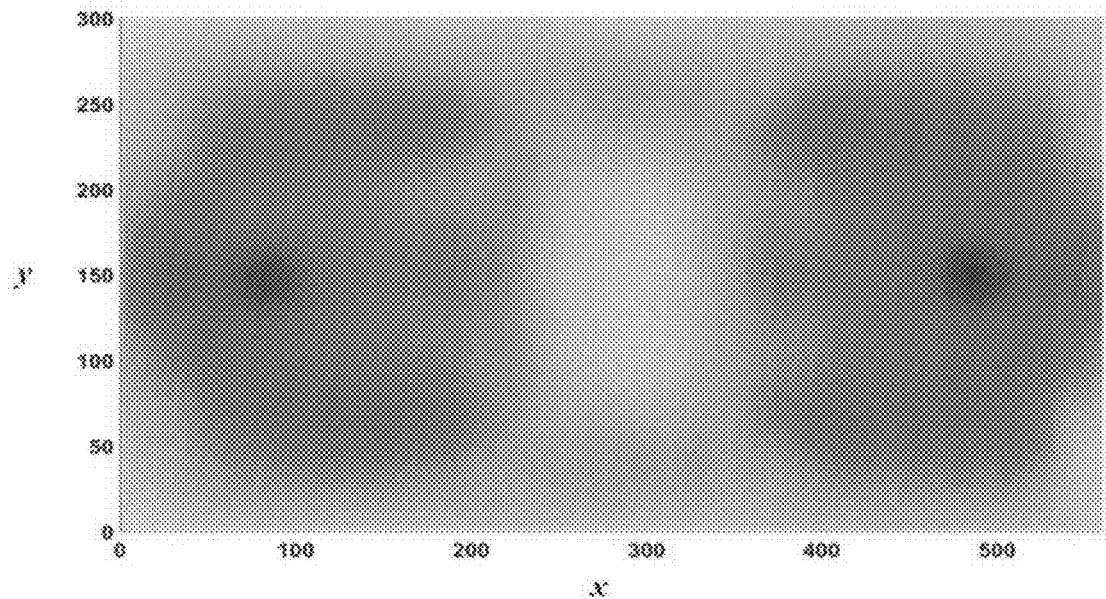

FIG. 13 B. Illustrates the THz image of Sample 2 developed by using Equation (21).

REFERENCE NUMERALS

101 Data input (acquisition or loading) unit whereby THz pulse on coordinates (i,j) is imported to the system
102 Computation unit: Fast Fourier transform (FFT)
103 Band-pass filter (BPF)
104 The unit that selects and gives the spectrum of the imaging pulse (Sample THz pulse and Reference THz pulse) to the PSF modeler
105 Data input: Optical, Sample, and System Parameters
106 Computation unit: PSF Modeler
107 Computation unit: Inverse Fast Fourier transform (IFFT)
108 Time-Domain Filter (TDF) Diffraction Suppression Unit wherein the intensity of the pixel at each coordinate (i,j) is computed according to the principle of Equation (18) or Equation (21)
109 Unit whereby pixels are mapped on the digital image
110 Logic unit for checking if the entire sample is processed
111 Moving to the next pixel
112 Computation unit: deconvolution
113 Memory and/or Display Units: Displaying and/or storing the enhanced-resolution THz image
201 Data input unit: Spectrum of the CW imaging system or its estimation
202 Data input unit: Optical, Sample, and System Parameters or their estimated values (such as NA, k, Depth of Layer, Pixel Size, Sampling Rate)
203 Computation unit: PSF Modeler
204 Data input unit: THz Image or Video from the CW THz Imaging System
205 Computation unit: Deconvolution
206 Memory and/or Display Units: Displaying and/or storing the Enhanced-Resolution THz Image unit
206 An optional feedback line providing feedback about the quality of the resulted THz image for iteratively tuning the PSF until achieving a desired enhanced-resolution THz image
701 Raw THz image developed by using Equation (17) where both reference and sample THz pulses are used to compute the intensity of pixels
702 Conventional THz image of the sample developed by using Equation (17) where only sample THz pulses are used to compute the intensity of pixels
703 THz image of the sample developed by using Equation (18) (used in block 108)
704 THz image of the sample developed by deconvolution of the THz image of block 703 and PSF of block 713
705 THz image developed by frequency-domain filtered THz pulses where BPF in block 103 is activated and Equation (18) in block 108 is used
706 Enhanced-resolution THz image (equivalent to the output of the system of FIG. 1 in block 113)
707 Equivalent to block 105 whereby Optical, Sample, and System Parameters are entered to the system to be used in block 104
708 Cut-off frequencies of the BPF (in block 103) are entered to the system by this block
709 Time interval of the sample THz pulse is entered in this box
710 The sample THz pulse
711 The sample THz pulse that is used for developing the PSF, this block, together with the reference THz pulse, is equivalent of 104 in the system of FIG. 1
712 Attenuation coefficient of the object developed according to Equation (12)
713 PSF developed according to PSF Equation (16), where the BPF in 103 is bypassed (the full spectrums of the THz beams are used as inputs to the PSF equation). This PSF is used to develop the image in 704
714 PSF developed according to PSF Equation (16), where the BPF in 103 is not bypassed (the filtered spectrums of the THz beams are used as inputs to the PSF equation). This PSF is used to develop the enhanced-resolution image in 706

DETAILED DESCRIPTION OF FIG. 1

FIG. 1 illustrates the block diagram of the disclosed system and method. THz imaging beam produced by a THz time-domain spectroscopy (TDS) system, such as the system of prior art invention in FIG. 3 A (U.S. Pat. No. 5,623,145), travels through the Sample. Said THz imaging beam is received by the THz receiver and is converted to an electronic pulse which can be recorded as a signal in time-domain. Each scanned point on the Sample will be represented by a time-domain signal. 101 sends these time-domain signals to 102. The FFT of the THz signal is computed in 102 and as a result, the time-domain signal is converted to a frequency-domain signal that can be manipulated by a frequency-domain filter. 103 is a frequency-domain band-pass filter (BPF) which can be considered as a combination of a low-pass filter (LPF) and a high-pass filter (HPF). Diffraction increases as the frequency of the beam decreases. The low-frequency of the THz signal is filtered-out in 103 to lower the blurring effect of diffraction. High-frequency noise is also filtered out in 103. 104 picks the Sample and Reference THz signals and provides it to 106. Sample and Reference THz signals are needed for developing the model of the PSF. 106 develops the model of the PSF according to the formulation provided in the next section of this disclosure, entitled "detailed description of the invention". 105 provides optical, sample and system parameters to 106 as these parameters are also needed to develop the model of the PSF. 107 computes the inverse FFT and converts back the frequency-domain version of the THz signal to the time-domain. 108 computes the intensity of the pixel according to the principles of Equation (18), or equivalently Equation (21). Using Equation (18), or equivalently Equation (21), in 108 suppresses diffraction effects and artifacts in the image. 109 maps the intensity of the pixel on a two-dimensional plane. 110 determines if the entire object is processed or not. If not, 111 increases the coordinates by one step. If 110 determines the entire object is processed, 112 computes the deconvolution of the image and the PSF. 113 is the display and/or memory that illustrates and stores the enhanced-resolution THz image.

DETAILED DESCRIPTION OF FIG. 2

Since in Continous-Wave (CW) THz imaging systems the THz imaging beam is not recorded as a time-domain signal, the system of FIG. 1 needs to be reduced to the system of FIG. 2 to process the THz images captured by CW THz imaging systems. In FIG. 2, block 201 (which is equivalent of 104 in FIG. 1) provides an estimation of the spectrum of the THz imaging beams to block 203 (which is equivalent of 106 in FIG. 1). Block 202 (which is equivalent of 105 in FIG. 1) provides Optical, System and Sample Parameters to block 203. In block 203 the PSF of the THz beam is modeled (or estimated). 204 is providing the THz image or Video captured by a Continous-Wave (CW) THz imaging system. In 205 said PSF is deconvolved to the THz image captured by a CW THz imaging system. 206 is a memory and/or display wherein the resulted enhanced-resolution THz image is stored and/or displayed. The dashed line between 206 and 203 is an optional feedback line providing feedback to the PSF modeler for adjusting the PSF until the sharpest image is achieved. A similar feedback line can be included in the system of FIG. 1 as well.

DETAILED DESCRIPTION OF THE INVENTION: OPERATION AND DESCRIPTION OF THE PROCESS

Transmission images of packaged objects can be developed by using beams with frequencies in THz regime [15]. For having a higher resolution, the beam is focused by using either mirrors or lenses and the object is raster scanned. The THz image of the object is developed by raster scanning the entire object and mapping the intensity of the traversed THz beam on a 2-dimensional image plane. Sample 1 and its transmission THz image are illustrated in FIG. 4. A and FIG. 4. B respectively. The raster scanning process of the sample by the THz imaging beam is mathematically modeled as a two-dimensional convolution of the object function and the PSF, as expressed in Equation (1).

$$i(x,y) = PSF(x,y) * o(x,y) \quad (1)$$

Where i is the image and o is the object function. The object function can be computed reversely from Equation (1) if the PSF is known.

$$o(x,y) = i(x,y) *^{-1} PSF(x,y) \quad (2)$$

PSF can be measured directly. A pinhole is placed in front of the THz receiver to limit the added uncertainty due to the diameter of the receiver of the THz beam. Such measured PSF is shown in FIG. 9. Since the diameter of the pinhole cannot be zero and has to be large enough to pass through sufficient intensity of the beam for triggering the THz receiver, measured PSF will not be free of uncertainty. In addition, measuring the PSF inside the packaged object is impossible. In Equation (2) the PSF at a z-depth inside the sample where the layer that is being imaged is located is needed. FIG. 10 illustrates the result of the deconvolution of the conventional THz image of Sample 2 and the measured PSF. In FIG. 10 it is observed that the quality of the resulted image is even poorer than that of the conventional THz image (illustrated in FIG. 5 B.) due to the mentioned uncertainties in the measured PSF. To avoid uncertainties that are added to the measured PSF due to the diameter of the pinhole, noise, and to have the PSF inside the packaged object, the mathematical equation for PSF has been developed and proposed to be used in Equation (2) by the present inventor [16]. FIG. 11 illustrates the modeled PSF and FIG. 12 illustrates the result of the deconvolution of the modeled PSF and the conventional THz image of Sample 2. It is observed in FIG. 12 that the quality of the resulted image is improved (the image is sharper and traces of the inside wires of the sample are observable) as compared with the conventional THz image (illustrated in FIG. 5 B.).

What follows is the principle of developing the equation for PSF as developed and proposed by the present inventor [17] with some additional modifications. In order to describe the transmission imaging process, a three-dimensional mathematical function is needed where z-direction is also included. The inclusion of z is represented by integrating (1) over z.

$$i(x, y) = \int_{z_t}^{z_d} \int_{x'} \int_{y'} o(x - x', y - y', z_i) PSF(x', y', z_i) dx' dy' dz \quad (3\text{-}a)$$

Where $z_t$ is the location of the THz transmitter and $z_d$ is the location of the THz detector on the z-axis.

In typical THz imaging systems, the center frequency and bandwidth are comparable. As a result, the beam cannot be treated as a monochromatic beam. For including the full spectrum, the PSF is reconstructed by the superposition of the monochromatic beams over the entire frequency band.

$$PSF = \int PSF(f) df \quad (3\text{-}b)$$

Jepsen and Keiding have shown that the output of PCA based THz-TDS systems include sidelobes. In this respect, THz focused PSF can be considered as a Bessel beam or an Airy disk [18]. In the same publication, Jepsen and Keiding have also proved that the main lobe in the output of such systems has a Gaussian profile. In addition, according to Sagan, when the truncation ratio (the ratio of the diameter of the Gaussian beam to the diameter of the truncating aperture) is set to 1, the sidelobes become negligible and the beam profile becomes purely Gaussian [19].

The source of the beam is a circular aperture lens-coupled antenna which output is approximated by Gaussian illumination distribution [20]. This illumination distribution remains Gaussian after exiting the circular aperture and cylindrical lenses of the imaging system [21]. PSFs with smaller diameters can be achieved by increasing the truncation ratio, W. However, the side lobes of the PSF grow larger as W increases. Side lobes contribute to the degradation of the resolution [19]. The fraction of the intensity of the central lobe is reported to be more than 95% of the total beam power where W=1 [22]. Thus, apertures in most of the imaging systems, including the experimental system which is used in this work, are chosen accordingly to achieve W≈1. As a result, the PSF of the typical THz imaging systems can be approximated by a $TEM_{00}$ mode Gaussian beam.

The spot size diameter of the Gaussian beam is defined to be where the intensity drops to $1/e^2$ of the peak value of the beam intensity. The radius of the spot at distance z from the beam waist is given by (4) [23].

$$w(z, f) = w(0, f)\sqrt{1 + \left(\frac{\lambda z}{\pi w^2(0, f)}\right)^2} \quad (4)$$

Where w(0, f) is the spot radius at the beam waist and f is the frequency of the beam. As mentioned, the THz beam spreads over the frequency band of a few THz and thus the center frequency of the beam is comparable to its bandwidth. Consequently, the bandwidth of the beam has to be incorporated as a variable into the PSF equation. In this respect, the intensity profile of the THz beam is represented by the Gaussian distribution in (5).

$$I(\rho,z,f) = I_0 \exp(-2\rho^2/w(z,f)^2) \quad (5)$$

Where $I_0 = I(0, z, f)$ is the intensity at the center of the beam and ρ is the radial position from the center of the beam on the corresponding z-plane at a distance z from the beam waist.

$$\rho^2 = x^2 + y^2 \quad (6)$$

The full width at half maximum (FWHM) for Gaussian distribution in (5) is given by:

$$FWHM(z,f) = \sqrt{2\ln 2}\, w(z,f) \quad (7)$$

On the other hand, FWHM of diffraction-limited focused spot is given by:

$$FWHM(0, f) = 1.13 k \lambda F\# = 0.565 \frac{k}{NA}\frac{c}{f} \quad (8)$$

Where k-factor depends on the truncation ratio and level of the irradiance, F # is the ratio of the focal length and the diameter of the focusing lens, and NA is the numerical-aperture [19]. Substituting (8) into (7) yields the relation of the beam waist and the physical parameters of the system:

$$w(0, f) = \frac{FWHM(0, f)}{\sqrt{2\ln 2}} = \frac{0.565}{\sqrt{2\ln 2}}\frac{k}{NA}\frac{c}{f} \quad (9)$$

Now, substituting (9) into (4) gives the relation between w(z,f) and the physical parameters of the system:

$$w(z, f) = \frac{0.565}{\sqrt{2\ln 2}}\frac{k}{NA}\frac{c}{f}\sqrt{1 + \left(\frac{2\ln 2}{c\pi}\left(\frac{NA}{0.565 k}\right)^2 f z\right)^2} \quad (10)$$

Substituting (10) into (5), yields the mathematical model of the beam profile.

$$I(\rho, z_{df}, f) = \quad (11)$$

$$I_0 \exp\left(-2\rho^2 / \frac{0.565}{\sqrt{2\ln 2}}\frac{k}{NA}\frac{c}{f}\sqrt{1 + \left(\frac{2\ln 2}{c\pi}\left(\frac{NA}{0.565 k}\right)^2 f z_{df}\right)^2}\right)$$

To avoid confusion between the depth of the layer inside the sample and the distance from the beam waist (or defocus), we indicated the distance from the beam waist in (11), and following equations by $z_{df}$ or $z_{defocus}$. The attenuation of the beam in the object is frequency-dependent. Since the imaging beam is not monochromatic, the frequency-dependency of the attenuation needs to be taken into account. Assuming that the measurement is done in a vacuum environment, the attenuation factor of the sample can be calculated by using Equation (12).

$$\alpha_{sample}(f) = -\frac{1}{z_{thickness}} \ln \frac{I_{sample}(\rho, z_{detector}, f)}{I_{ref}(\rho, z_{detector}, f)} \quad (12)$$

Where $I_{ref}(\rho, z_{detector}, f)$ is the intensity of the reference beam at the THz detector plane, without the presence of the sample in the THz imaging system, $I_{sample}(\rho, z_{detector}, f)$ is the intensity of the beam at the THz detector plane with the presence of the sample in the THz imaging system, and $z_{thickness}$ is the thickness of the sample. Since the attenuation factor can be obtained by using (12), the intensity of the beam at any depth $z_{ds}$ inside the sample can be obtained by substituting the attenuation factor into (13) assuming that the measurement is done in a vacuum environment.

$$I(\rho, z_{ds}, f) = e^{-z_{ds}\alpha(f)} I_{ref}(\rho, z_{detector}, f) \quad (13)$$

Substituting (13) into (11) yields:

$$I(\rho, z, f) = I_{ref}(0, z_{detector}, f) \exp\left(-z_{ds}\alpha(f) - \right. \quad (14)$$

$$\left. 2\rho^2 / \left(\frac{0.565}{\sqrt{2\ln 2}}\frac{k}{NA}\frac{c}{f}\sqrt{1 + \left(\frac{2\ln 2}{c\pi}\left(\frac{NA}{0.565 k}\right)^2 f z_{df}\right)^2}\right)^2\right)$$

The digitalized version of integral over the spectrum in (3) can be implemented by (15).

$$PSF(z, f) = \sum_f I_{ref}(0, z_{detector}, f) \quad (15)$$

$$\exp\left(-z_{ds} b \alpha(f) - \rho^2/2 \left(0.44 \frac{k}{NA}\frac{c}{f}\sqrt{1 + \left(\frac{1.47}{c\pi}\left(\frac{NA}{k}\right)^2 f z_{df}\right)^2}\right)\right)$$

Where a and b are the adjustment factors. The inclusion of z is necessary since THz images are developed via the transmission of the imaging beam through the sample. Samples could be thick and as a result, not all the layers happen to be on the focal plane. For the same reason and the fact that beams with higher frequencies go through higher attenuations inside the sample, not all the layers are imaged via imaging beams with identical spectrums. Accordingly, $z_{ds}$ and $z_{df}$ in (15) accommodate attenuation and divergence of the beam in the sample respectively. Finally, substituting (15) into (1) yields the THz imaging equation which can be used for simulating the THz images.

$$i(x, y) = \sum_f I_{ref}(0, z_{detector}, f) \exp\left(-z_{ds} b\alpha(f) - \rho^2/2 \left(0.44 \frac{k}{NA} \frac{c}{f} \sqrt{1 + \left(\frac{1.47}{c\pi}\left(\frac{NA}{k}\right)^2 f z_{df}\right)^2}\right)^2\right) * o(x, y, z) \quad (16)$$

Equation (16) can be further completed to include refraction effects (as the refractive index of the sample and ambient air or vacuum are different), aberration, scattering of the beam at edges and etc. This PSF equation can also be further modified, simplified, and prepared to be implemented by digital computers. In case the reflection images are being developed, the angle of the incident beam needs to be included in (16) as well. Accordingly, PSF is developed in block 106.

As an additional advantage, the PSF can be used for developing a simulated terahertz image. By substituting the PSF from equation (16) and the object function, which can be an X-ray image of the package sample, the simulated THz image of the packaged item will be achieved. In the prior art the maximum of the THz pulse or the range of it (the difference between the maximum and minimum) have been used for developing the intensity of the pixel as indicated in Equation (17):

Intensity of Pixel at coordinate $(i,j)$=(maximum of THz pulse at $(i,j)$)−(minimum of THz pulse at $(i,j)$) (17)

Diffracted beams are diverged, they need to travel through a longer distance, and hence they need more time to arrive at the detector plane. As a result, we can expect that filtering out the beams with higher time delays will result in an image with less diffraction distortion. Accordingly, this disclosure reveals that using the magnitude of the THz pulse at a time-delay before the maximum of the THz pulse leads to a better resolution. As FIG. 8 illustrates the minimum of the THz pulse has a higher time delay than the maximum of the THz pulse. In other words, the amount of diffraction in beams that are forming the minimum of the THz pulse is higher than the amount of the diffraction in beams that are forming the pulse where the time-delay is lower than that of the minimum point. Consequently, we can expect to achieve an image with less diffraction distortion if the magnitude of the THz pulse at a point with less time delay than that of the minimum of the pulse is used to develop the THz image. In Equation (18) instead of the minimum of the THz pulse, the magnitude of the THz pulse at a point before (with less time-delay than) the maximum of the THz pulse is used:

Intensity of Pixel at coordinate $(i,j)$=(maximum of THz pulse at $(i,j)$)−(amplitude of THz pulse at a time-advance before that of the maximum of the THz pulse at $(i,j)$) (18)

Equation (18) is used in block 108 for developing the intensity of the pixels in the disclosed system of this invention. FIG. 4 C. and FIG. 4 D. are developed by using Equation (18) in block 108, these two images show less blur and artifacts compared with their counterparts shown respectively in FIG. 4 B. and FIG. 4 F. developed by the conventional method represented in Equation (17). The timed-advance in Equation (18) can be found numerically by starting from an estimated value until the sharpest image is achieved. In addition, rigorous calculations can be performed to compute the time-advance according to equations of diffraction as proposed and demonstrated by the present inventor [24]. For example, such calculations is performed here for Sample 2. The dimension of the main lobe of the diffraction pattern can be approximated as:

$$W_x(0, 0) = \frac{\lambda d}{D_x} \quad (19\text{-a})$$

$$W_y(0, 0) = \frac{\lambda d}{D_y} \quad (19\text{-b})$$

The difference between the distances that the beam needs to travel to the center of the main lobe and the side of the main lobe on y-axis can be calculated as:

$$\Delta d_y = \sqrt{d_{cl}^2 + W_y^2} - d_{cl} \quad (20)$$

In (20), $d_{cl}$ is the distance between the sample and the focusing/collimating lens along with the z-axis.

Sample 2 is a 28 mm by 14 mm, 44 pins packaged IC. The separation between the pins of the IC can be measured by a Vernier caliper as $D_x$=0.7 mm the length of these separations inside the packaging can also be approximated as $D_y$=7 mm. For Sample 2 dimensions in (19a) and (19b) are calculated to be $W_x$=15.42 mm and $W_y$=1.54 mm. Thus, the smallest time difference between the time-delay for the beam to get to the edge of the main lobe at $W_y$ with reference to the time-delay that the beam needs to travel directly on the center of the main lobe is calculated to be $t_d$=0.7 ps. In other words, filtering the beams with delays of $t_d$ and higher (not using them for developing the image), will result in an image with less diffraction distortion. Accordingly, Equation (21) can be used in block 108.

$$I(i,j) = s(t - t_d)(i,j) - s(t_{floor})(i,j) \quad (21)$$

Equation (21) can be read as:

Intensity of Pixel at coordinate $(i,j)$=(magnitude of THz pulse at $(i,j)$ with a time-advance of $t_d$ with respect to the time delay of the maximum of the THz pulse at $(i,j)$)−(amplitude of THz pulse at its floor at $(i,j)$) (22)

FIG. 13. A. illustrate the magnitude of the terahertz pulse at a time-advance of 0.7 ps before the maximum of the terahertz pulse. This magnitude is used in Equation (21) for developing the THz image. FIG. 13. B. illustrates the resulted THz image developed by means of Equation (21). This image is sharper than its counterpart developed by means of Equation (17) illustrated in FIG. 5 B. Traces of the inside wires can be observed on the image of FIG. 13. B. while traces of the inside wires are not observable on the image of FIG. 5 B.

Diffraction increases as the frequency of the beam decreases. The low-frequency of the THz signal is filtered-out in 103 to lower the blurring effect of diffraction. High-frequency noise is also filtered out in 103.

The output signal of 103 is given to 107 where it is converted back to time-domain by inverse FFT. In case that the BPF in 103 is bypassed by setting its low and high cut-off frequencies to respectively 0 and infinity, the deconvolution (performed in 112) of the modeled PSF (developed in 106) and THz image (developed in 109) will result in the image illustrated in FIG. 4 E. where time-domain diffraction suppression filter (Equation (18)) in 108 has also been activated.

109 maps and stores the pixels of the image until the sample is entirely processed. 110 determines if the process of the sample is completed and all the pixels of the image are developed in 109. If yes, 112 computes the deconvolution of the image and the PSF. 113 sends the resulted enhanced-resolution image to the display and/or the memory units. The final enhanced-resolution image is shown in FIG. 4 D. for Sample 1, FIG. 5 G. for Sample 2, and FIG. 6 D. for Sample 3. As shown in FIG. 5 J. and FIG. 5 G. features as small as 300 μm, and features with separations of 550 μm are observable in the resulted enhanced-resolution image. The size and locations of the features are confirmed by overlaying the resulted enhanced-resolution THz images on the high-resolution X-ray images. In FIG. 4 G. and FIG. 5 F. X-ray images of Sample 1 and Sample 2 are illustrated respectively. In FIG. 4 H. and FIG. 5 E the enhanced-resolution images and X-ray images of Sample 1 and Sample 2 are overlayed to prove the accuracy of the results. In FIG. 5 J. the 300 μm feature which is observed in the enhanced-resolution THz image is shown. In FIG. 5 I. the x-Ray image of the same feature is shown to prove the accuracy of the results. In FIG. 5 K. the conventional THz image is shown; the resolution of the conventional THz image is not sufficient to observe the feature.

The disclosed systems and processes of FIG. 1 and FIG. 2 can be implemented by computer programs and standalone specifically designed circuitry with digital microcontrollers, digital signal processors (DSP), and analog circuit components to perform the process and computations. FIG. 7. A, B, C illustrate a Graphical User Interface (GUI) prototype of the system of FIG. 1. implemented by digital computers processing images of Samples 1, 2, and 3 respectively. While the above description contains many specifications, these should not be construed as limitations on the scope of any embodiment, but as exemplification of the presently preferred embodiments thereof. Many other ramifications and variations are possible within the teachings of the various embodiments. For example, as a demonstration of the feasibility of the invention, the process is performed and the results are shown for three samples as examples and for THz systems. Thus, the scope of the invention should be determined by the appended claims and their legal equivalents and not by the examples given.

CONCLUSION

In this disclosure, a novel resolution enhancement method and system for enhancing the resolution of THz imaging systems has been disclosed. The PSF of the imaging beam has been modeled by incorporating the spectrum of the imaging beam and the absorption coefficient of the object, or equivalently, the spectrum of the beam that has passed through the object (or the beam that has been reflected from the object in case of the reflection mode imaging), into a Gaussian beams distribution. The frequency-domain and time-domain filtering of the beam has also been incorporated as building blocks into the system. The deconvolution of the image and the modeled PSF has been computed. A novel method and system has also disclosed for simulation of THz imaging systems wherein the PSF is modeled and convolution of the modeled PSF and the object function is computed, the output of this system is a simulated THz image.

CITATION LIST

[1] S. Hunsche, M. Koch, I. Brener, and M. Nuss, "THz near-field imaging," *Opt. Commun.*, vol. 150, no. 1-6, pp. 22-26, May 1998.

[2] F. Blanchard, A. Doi, T. Tanaka, and K. Tanaka, "Real-Time, Subwavelength Terahertz Imaging," *Annu. Rev. Mater. Res.*, vol. 43, no. 1, pp. 237-259, July 2013.

[3] V. A. Trofimov, V. V. Trofimov, and I. E. Kuchik, "Resolution enhancing of commercially available passive THz cameras due to computer processing," 2014, vol. 4, no. 1, p. 91990P.

[4] V. A. Trofimov and V. V. Trofimov, "New algorithm for the passive THz image quality enhancement," 2016, p. 98560M.

[5] C. Schildknecht, T. Kleine-Ostmann, P. Knobloch, E. Rehberg, and M. Koch, "Numerical image enhancement for THz time-domain spectroscopy," in *THz 2002-2002 IEEE 10th International Conference on Terahertz Electronics, Proceedings*, 2002, vol. 1, no. 1, pp. 157-160.

[6] B. B. Hu and M. C. Nuss, "Imaging with terahertz waves," *Opt. Lett.*, vol. 20, no. 16, p. 1716, August 1995.

[7] N. M. Burford and M. O. El-Shenawee, "Enhancement of terahertz imaging of packaged power electronic devices," in 2015 *IEEE International Symposium on Antennas and Propagation & USNC/URSI National Radio Science Meeting*, 2015, vol. 2015-October, pp. 1300-1301.

[8] Z. Zhang, Y. Zhang, G. Zhao, and C. Zhang, "Terahertz time-domain spectroscopy for explosive imaging," *Opt.— Int. J. Light Electron Opt.*, vol. 118, no. 7, pp. 325-329, July 2007.

"Terahertz Time Domain Solutions|Menlo Systems." [Online]. Available: http://www.menlosystems.com/products/thz-time-domain-solutions/. [Accessed: 26 Sep. 2017].

"THz Bandpass Filters: 10 μm-590 μm Center Wavelength." [Online]. Available: https://www.thorlabs.com/newgrouppage9.cfm?objectgroup_id=7611. [Accessed: 26 Sep. 2017].

[11] "THz lenses." [Online]. Available: http://www.batop.de/products/terahertz/THz-parts/THz-parts.html. [Accessed: 26 Sep. 2017].

[12] N. V. Chernomyrdin et al., "Wide-aperture aspherical lens for high-resolution terahertz imaging," *Rev. Sci. Instrum.*, vol. 88, no. 1, p. 014703, 2017.

[13] N. V. Chernomyrdin et al., "Solid immersion terahertz imaging with sub-wavelength resolution," *Appl. Phys. Lett.*, vol. 110, no. 22, p. 221109, 2017.

[14] M. S. Kulya, N. S. Balbekin, I. V. Gredyuhina, M. V. Uspenskaya, A. P. Nechiporenko, and N. V. Petrov, "Computational terahertz imaging with dispersive objects," *J. Mod. Opt.*, vol. 64, no. 13, pp. 1283-1288, July 2017.

[15] M. C. Nuss, "Method and apparatus for terahertz imaging," 1996.

[16] K. Ahi, S. Shahbazmohamadi, and N. Asadizanjani, "Quality control and authentication of packaged integrated circuits using enhanced-spatial-resolution terahertz time-domain spectroscopy and imaging," *Optics and Lasers in Engineering*, 2017.

[17] K. Ahi, "Developing next generation of electric grids for fulfilling deficiencies of conventional grids in supporting today's requirements," in 2011 *International Conference on Power Engineering, Energy and Electrical Drives*, 2011, pp. 1-7.

[18] P. U. Jepsen and S. R. Keiding, "Radiation patterns from lens-coupled terahertz antennas.," *Opt. Lett.*, vol. 20, no. 8, pp. 807-809, 1995.

[19] S. Sagan, "Optical Systems for Laser Scanners," in *Handbook of Optical and Laser Scanning, Second Edition*, CRC Press, 2011, pp. 69-132.

[20] E. R. Brown, "Fundamentals of Terrestrial Millimeter-Wave and THz Remote Sensing," *Int. J. High Speed Electron. Syst.*, vol. 13, no. 04, pp. 995-1097, 2003.

[21] B. E. A. Saleh and M. C. Teich, "Fundamentals of Photonics, 2nd Edition," *Wiley*. p. 1200, 2007.

[22] H. T. Yura and T. S. Rose, "Gaussian beam transfer through hard-aperture optics.," *Appl. Opt.*, vol. 34, no. 30, pp. 6826-6828, 1995.

[23] S. Fathololoumi et al., "Beam Pattern Investigation of Terahertz Quantum Cascade Lasers," *PIERS Online*, vol. 4, no. 2, pp. 267-270, 2008.

[24] K. Ahi, "A method and system for enhancing the resolution of terahertz imaging," *Meas. J. Int. Meas. Confed.*, vol. 138, pp. 614-619, May 2019.

I claim:

1. A method for improving resolution of terahertz imaging of a sample, comprising:
    (a) using terahertz time-domain signals acquired by a terahertz time-domain spectroscopy system for acquiring a terahertz image,
    (b) using a computer comprising a memory and a central processing unit for storing data and performing time-domain and frequency-domain processes on said time-domain terahertz signals,
    (c) converting said time-domain terahertz signals to frequency-domain signals,
    (d) processing said frequency-domain signals by means of a frequency-domain filter or a plurality of frequency-domain filters to achieve processed frequency-domain signals,
    (e) converting said processed frequency-domain signals back to time-domain to achieve processed time-domain signals,
    (f) developing a terahertz image using said processed time-domain signals,
    (g) developing an enhanced-resolution terahertz image by computing deconvolution of said terahertz image and a point spread function,
    (h) displaying or storing, or displaying and storing, said enhanced-resolution terahertz image.

2. The method of claim 1, wherein said frequency-domain filter is a low-pass filter, or a high-pass filter, or a band-pass filter encompassing a combination of a low-pass filter and a high-pass filter.

3. The method of claim 1, further comprising using a time-domain filter for suppressing diffraction wherein for developing said terahertz image intensity of said processed time-domain signals at a time delay smaller than the time delay of the peak value of said terahertz time-domain signals is used.

4. The method of claim 1, wherein said point spread function is measured.

5. The method of claim 1, wherein said point spread function is numerically estimated.

6. The method of claim 1, wherein said point spread function is modeled by means of a mathematical equation.

7. The method of claim 6, wherein at least one optical parameter, or estimation of at least one optical parameter, of the imaging system of said terahertz time-domain spectroscopy system is used as an input for said mathematical equation for developing said point spread function.

8. The method of claim 7, wherein at least one parameter, or estimation of at least one parameter, of said terahertz time-domain spectroscopy system, such as the spectrum of the terahertz pulse of said terahertz time-domain spectroscopy system, is used as an input for said mathematical equation for developing said point spread function.

9. The method of claim 8, wherein at least one parameter, or estimation of at least one parameter, of said sample is used as an input parameter for said mathematical equation for developing said point spread function.

10. The method of claim 5, wherein said estimated point spread function is tuned iteratively until said enhanced-resolution terahertz image is achieved.

11. A method for improving the resolution of terahertz imaging of a sample, comprising:
    (a) using terahertz data acquired by a continuous-wave terahertz imaging system for acquiring a terahertz image,
    (b) using a computer comprising a memory and a central processing unit for storing data and performing processes on said terahertz data,
    (c) developing a terahertz image using said terahertz data,
    (d) developing an enhanced-resolution terahertz image by computing deconvolution of said terahertz image and a point spread function,
    (e) displaying or storing, or displaying and storing, said enhanced-resolution terahertz image.

12. The method of claim 11, wherein said point spread function is measured.

13. The method of claim 11, wherein said point spread function is numerically estimated.

14. The method of claim 11, wherein said point spread function is modeled by means of a mathematical equation.

15. The method of claim 14, wherein at least one optical parameter, or estimation of at least one optical parameter, of the imaging system of said continuous-wave terahertz imaging system is used as an input parameter for said mathematical equation for developing said point spread function.

16. The method of claim 15, wherein at least one parameter, or estimation of at least one parameter, of said continuous-wave terahertz imaging system, such as the spectrum of the terahertz beam of said continuous-wave terahertz imaging system, is used as an input parameter for said mathematical equation for developing said point spread function.

17. The method of claim 16, wherein at least one parameter, or estimation of at least one parameter, of said sample is used as an input parameter for said mathematical equation for developing said point spread function.

18. The method of claim 13, wherein said estimated point spread function is tuned iteratively until said enhanced-resolution terahertz image is achieved.

19. A method for simulating a terahertz imaging system and developing a simulated terahertz image of a sample, comprising:
    (a) using a computer comprising a memory and a central processing unit for storing data and performing processes on said data,
    (b) using an object function of said sample,
    (c) generating an estimation or a model of the point spread function of imaging terahertz beam of said terahertz imaging system,
    wherein said simulated terahertz image of said sample is developed by means of convolution of said point spread function and said object function wherein said convolution is computed by said computer.

20. The method of claim 19, wherein the model of said point spread function is developed by means of a mathematical equation wherein optical parameters of said terahertz imaging system and parameters of said sample are used as input parameters.

* * * * *